US012198706B2

(12) United States Patent
Xia et al.

(10) Patent No.: US 12,198,706 B2
(45) Date of Patent: Jan. 14, 2025

(54) AUDIO SIGNAL CODING METHOD AND APPARATUS

(71) Applicant: HUAWEI TECHNOLOGIES CO., LTD., Shenzhen (CN)

(72) Inventors: Bingyin Xia, Beijing (CN); Jiawei Li, Beijing (CN); Zhe Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 17/969,454

(22) Filed: Oct. 19, 2022

(65) Prior Publication Data

US 2023/0040515 A1 Feb. 9, 2023

Related U.S. Application Data

(63) Continuation of application No. PCT/CN2021/083029, filed on Mar. 25, 2021.

(30) Foreign Application Priority Data

Apr. 21, 2020 (CN) ......................... 202010318590.8

(51) Int. Cl.
*G10L 19/00* (2013.01)
*G10L 19/02* (2013.01)
(Continued)

(52) U.S. Cl.
CPC .............. *G10L 19/02* (2013.01); *G10L 19/22* (2013.01)

(58) Field of Classification Search
None
See application file for complete search history.

(56) References Cited

U.S. PATENT DOCUMENTS 9,626,972 B2 * 4/2017 Liu ........................ G10L 19/005
2010/0241423 A1 9/2010 Jackson et al.
(Continued)

FOREIGN PATENT DOCUMENTS

CN 101620854 A 1/2010
CN 104321815 A 1/2015
(Continued)

OTHER PUBLICATIONS

Samaali et al., "High-Frequency Tonal Components Restoration in Low-Bitrate Audio Coding Using Multiple Spectral Translations," 2015 23rd European Signal Processing Conference (EUSIPCO), Total 5 pages (2015).

*Primary Examiner* — Satwant K Singh
(74) *Attorney, Agent, or Firm* — Leydig, Voit & Mayer, Ltd.

(57) ABSTRACT

An audio signal coding method is provided that includes: obtaining a current frame of an audio signal; obtaining a coding parameter based on a power spectrum ratio of a current frequency in a current frequency area of at least a part of signals of the current frame, where the coding parameter indicates tonal component information of the at least a part of signals, the tonal component information includes at least one of location information of a tonal component, quantity information of tonal components, amplitude information of the tonal component, or energy information of the tonal component, and the power spectrum ratio of the current frequency is a ratio of a value of a power spectrum of the current frequency to a mean value of power spectrums of the current frequency area; and performing bitstream multiplexing on the coding parameter to obtain a coded bitstream.

20 Claims, 6 Drawing Sheets

(51) Int. Cl.

| | |
|---|---|
| ***G10L 19/22*** | (2013.01) |
| ***G10L 21/00*** | (2013.01) |

(56) References Cited

U.S. PATENT DOCUMENTS

2010/0280833 A1* 11/2010 Yamanashi ........... G10L 21/038 704/500
2013/0117029 A1* 5/2013 Liu ....................... G10L 19/265 704/500
2013/0290003 A1* 10/2013 Choo ...................... G10L 19/02 704/500
2023/0105508 A1* 4/2023 Xia ..................... G10L 19/0204 704/500
2023/0137053 A1* 5/2023 Xia ......................... G10L 19/02 704/500
2023/0138871 A1* 5/2023 Xia ....................... G10L 19/008 381/23

FOREIGN PATENT DOCUMENTS

CN 104584124 A 4/2015
CN 105103226 A 11/2015
EP 3343560 A1 7/2018
EP 4152317 A1 3/2023

* cited by examiner

AUDIO SIGNAL CODING METHOD AND APPARATUS

CROSS-REFERENCE TO RELATED APPLICATIONS

This application is a continuation of International Application No. PCT/CN2021/083029, filed on Mar. 25, 2021, which claims priority to Chinese Patent Application No. 202010318590.8, filed on Apr. 21, 2020. The disclosures of the aforementioned applications are hereby incorporated by reference in their entireties.

TECHNICAL FIELD

This application relates to audio coding and decoding technologies, and in particular, to an audio signal coding method and apparatus.

BACKGROUND

With continuous development of multimedia technologies, audio has been widely used in the fields such as multimedia communication, consumer electronics, virtual reality, and human-computer interaction. Users have increasingly high requirements on audio quality. Three-dimensional audio (3D audio) has a sense of space close to reality, can provide a good immersive experience for a user, and has become a new trend of the multimedia technologies.

Audio signals that need to be compressed and coded by a three-dimensional audio codec include multiple signals. Generally, the three-dimensional audio codec downmixes the multiple signals based on correlation between channels, to obtain a downmixed signal and a multi-channel coding parameter. Generally, a quantity of channels of the downmixed signal is far less than a quantity of channels of an input audio signal. Then, the downmixed signal and the multi-channel coding parameter are coded. A quantity of bits for coding the downmixed signal and the multi-channel coding parameter is far less than a quantity of bits for independently coding the multiple signals. In the process of coding the downmixed signal and the multi-channel coding parameter, correlation between signals in different frequency bands may be further used for coding, to reduce a coding bit rate.

A basic principle of coding based on the correlation between signals in different frequency bands is to code a high frequency band signal based on a low frequency band signal and the correlation between signals in different frequency bands and by using a bandwidth extension technology or a spectral band replication technology, to code the high frequency band signal with a small quantity of bits. This reduces a coding bit rate of an entire multidimensional encoder. However, in a real audio signal, a spectrum of a high frequency band usually has some tonal components that are not similar to a spectrum of a low frequency band. To code tonal component information in a high frequency band signal, the tonal component information that needs to be coded may be determined according to a tonal detection algorithm, and then the tonal component information is coded, so that a decoder side can accurately obtain the high frequency band signal through decoding.

How to accurately determine tonal component information of a high frequency band signal to improve quality of audio signal coding becomes a technical problem to be urgently resolved.

SUMMARY

This application provides an audio signal coding method and apparatus, to improve quality of audio signal coding.

According to a first aspect, this application provides an audio signal coding method. The method may include: obtaining a current frame of an audio signal; obtaining a coding parameter based on a power spectrum ratio of a current frequency in a current frequency area of at least a part of signals of the current frame, where the coding parameter indicates tonal component information of the at least a part of signals, the tonal component information includes at least one of location information of a tonal component, quantity information of tonal components, amplitude information of the tonal component, or energy information of the tonal component, and the power spectrum ratio of the current frequency is a ratio of a value of a power spectrum of the current frequency to a mean value of power spectrums in the current frequency area; and performing bitstream multiplexing on the coding parameter to obtain a coded bitstream.

In this implementation, the tonal component information of the at least a part of signals is obtained by using the power spectrum ratio of the current frequency of the at least a part of signals of the current frame of the audio signal, and the coded bitstream is obtained based on the tonal component information. Because the power spectrum ratio is a ratio of a power spectrum to a mean value of the power spectrums, and can better reflect a signal characteristic, the tonal component information can be accurately obtained, so that a decoder side can accurately reconstruct the audio signal based on the tonal component information. This improves quality of coding.

In a possible design, the obtaining a coding parameter based on a power spectrum ratio of a current frequency in a current frequency area of at least a part of signals may include: performing peak search in the current frequency area based on the power spectrum ratio of the current frequency, to obtain at least one of quantity information of peaks, location information of the peak, amplitude information of the peak, or energy information of the peak in the current frequency area, where the peak is a power spectrum peak or a power spectrum ratio peak; and obtaining the coding parameter based on at least one of the quantity information of peaks, the location information of the peak, the amplitude information of the peak, or the energy information of the peak in the current frequency area.

In this implementation, peak search is performed in the current frequency area based on the power spectrum ratio of the current frequency, to obtain related information (for example, at least one of the quantity information, the location information, the amplitude information, or the energy information) of the peak in the current frequency area, and the foregoing coding parameter is obtained based on the related information of the peak in the current frequency area, so that the decoder side can reconstruct the audio signal more accurately based on the coding parameter. This improves quality of coding. Because the power spectrum ratio is used in the peak search process, accuracy of the peak obtained through search can be improved. This helps improve accuracy of the tonal component information.

In addition, because a dynamic range of the power spectrum is large, peak search efficiency can be improved by using the power spectrum ratio.

In a possible design, the performing peak search in the current frequency area based on the power spectrum ratio of the current frequency may include: performing peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency.

The left neighboring area of the current frequency includes N_neighbor_l frequencies whose frequency numbers are smaller than a frequency number of the current frequency, and N_neighbor_l is any natural number. The right neighboring area of the current frequency includes N_neighbor_r frequencies whose frequency numbers are greater than the frequency number of the current frequency, and N_neighbor_r is any natural number.

The left neighboring frequency of the current frequency is a frequency whose frequency number is 1 smaller than that of the current frequency, and the right neighboring frequency of the current frequency is a frequency whose frequency number is 1 greater than that of the current frequency.

In this implementation, peak search is performed in the current frequency area based on the power spectrum ratio of the current frequency, the mean value of the power spectrum ratios of the current frequency area, the power spectrum ratio of the left neighboring frequency of the current frequency, the power spectrum ratio of the right neighboring frequency of the current frequency, the mean value of the power spectrum ratios of the left neighboring area of the current frequency, and the mean value of the power spectrum ratios of the right neighboring area of the current frequency. This can improve accuracy of the peak obtained through search.

In a possible design, the performing peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency may include: determining whether the power spectrum ratio of the current frequency meets the following conditions: greater than or equal to a first preset threshold; greater than the power spectrum ratio of the left neighboring frequency of the current frequency; greater than the power spectrum ratio of the right neighboring frequency of the current frequency; a difference between the power spectrum ratio of the current frequency and the mean value of the power spectrum ratios of the left neighboring area of the current frequency is greater than a second preset threshold; a difference between the power spectrum ratio of the current frequency and the mean value of the power spectrum ratios of the right neighboring area of the current frequency is greater than a third preset threshold; and a difference between the power spectrum ratio of the current frequency and the mean value of the power spectrum ratios of the current frequency area is greater than a fourth preset threshold; and determining that the current frequency is a frequency corresponding to the peak when the power spectrum ratio of the current frequency meets the conditions.

In a possible design, the performing peak search in the current frequency area based on the power spectrum ratio of the current frequency may include: determining whether the power spectrum ratio of the current frequency meets at least one of the following conditions: greater than or equal to the first preset threshold; greater than the power spectrum ratio of the left neighboring frequency of the current frequency; greater than the power spectrum ratio of the right neighboring frequency of the current frequency; greater than the mean value of the power spectrum ratios of the left neighboring area of the current frequency; greater than the mean value of the power spectrum ratios of the right neighboring area of the current frequency; or greater than the mean value of the power spectrum ratios of the current frequency area; and determining that the current frequency is a frequency corresponding to the peak when at least one of the conditions is met.

In a possible design, the performing peak search in the current frequency area based on the power spectrum ratio of the current frequency may include: determining whether the power spectrum ratio of the current frequency meets the following conditions: greater than or equal to the first preset threshold; greater than the power spectrum ratio of the left neighboring frequency of the current frequency; and greater than the power spectrum ratio of the right neighboring frequency of the current frequency; and determining that the current frequency is a frequency corresponding to the peak when the conditions are met.

In a possible design, the obtaining the coding parameter based on at least one of the quantity information of peaks, the location information of the peak, the amplitude information of the peak, or the energy information of the peak in the current frequency area may include: determining at least one of the quantity information of tonal components, the location information of the tonal component, the amplitude information of the tonal component, or the energy information of the tonal component based on at least one of the quantity information of peaks, the location information of the peak, the amplitude information of the peak, or the energy information of the peak in the current frequency area; and obtaining the coding parameter based on at least one of the quantity information of tonal components, the location information of the tonal component, the amplitude information of the tonal component, or the energy information of the tonal component.

In a possible design, the at least a part of signals include a high frequency band signal of the current frame.

In this implementation, the tonal component information of the high frequency band signal of the current frame can be accurately obtained based on the power spectrum ratio. This improves quality of coding.

According to a second aspect, an embodiment of this application provides an audio signal coding apparatus. The audio signal coding apparatus may be an encoder or a core encoder, or may be a functional module that is in the encoder or the core encoder and that is configured to implement the method in any one of the first aspect or the possible designs of the first aspect. The audio signal coding apparatus may implement functions performed in the first aspect or the possible designs of the first aspect, and the functions may be implemented by hardware executing corresponding software. The hardware or software includes one or more modules corresponding to the functions. For example, in a possible implementation, the audio signal coding apparatus may include an obtaining module, a coding parameter determining module, and a bitstream multiplexing module.

The obtaining module is configured to obtain a current frame of an audio signal. The coding parameter determining module is configured to obtain a coding parameter based on a power spectrum ratio of a current frequency in a current frequency area of at least a part of signals of the current frame. The coding parameter indicates tonal component information of the at least a part of signals. The tonal component information includes at least one of location information of a tonal component, quantity information of tonal components, amplitude information of the tonal component, or energy information of the tonal component. The power spectrum ratio of the current frequency is a ratio of a value of a power spectrum of the current frequency to a mean value of power spectrums in the current frequency area. The bitstream multiplexing module is configured to perform bitstream multiplexing on the coding parameter to obtain a coded bitstream.

In a possible design, the coding parameter determining module is configured to: perform peak search in the current frequency area based on the power spectrum ratio of the current frequency, to obtain at least one of quantity information of peaks, location information of the peak, amplitude information of the peak, or energy information of the peak in the current frequency area; and obtain the coding parameter based on at least one of the quantity information of peaks, the location information of the peak, the amplitude information of the peak, or the energy information of the peak in the current frequency area.

In a possible design, the coding parameter determining module is configured to: perform peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency.

The left neighboring area of the current frequency includes N_neighbor_l frequencies whose frequency numbers are smaller than a frequency number of the current frequency, and N_neighbor_l is any natural number. The right neighboring area of the current frequency includes N_neighbor_r frequencies whose frequency numbers are greater than the frequency number of the current frequency, and N_neighbor_r is any natural number.

The left neighboring frequency of the current frequency is a frequency whose frequency number is 1 smaller than that of the current frequency, and the right neighboring frequency of the current frequency is a frequency whose frequency number is 1 greater than that of the current frequency.

In a possible design, the coding parameter determining module is configured to: determine whether the power spectrum ratio of the current frequency meets the following conditions: greater than or equal to a first preset threshold; greater than the power spectrum ratio of the left neighboring frequency of the current frequency; greater than the power spectrum ratio of the right neighboring frequency of the current frequency; a difference between the power spectrum ratio of the current frequency and the mean value of the power spectrum ratios of the left neighboring area of the current frequency is greater than a second preset threshold; a difference between the power spectrum ratio of the current frequency and the mean value of the power spectrum ratios of the right neighboring area of the current frequency is greater than a third preset threshold; and a difference between the power spectrum ratio of the current frequency and the mean value of the power spectrum ratios of the current frequency area is greater than a fourth preset threshold; and determine that the current frequency is a frequency corresponding to the peak when the power spectrum ratio of the current frequency meets the conditions.

In a possible design, the coding parameter determining module is configured to: determine whether the power spectrum ratio of the current frequency meets at least one of the following conditions: greater than or equal to the first preset threshold; greater than the power spectrum ratio of the left neighboring frequency of the current frequency; greater than the power spectrum ratio of the right neighboring frequency of the current frequency; greater than the mean value of the power spectrum ratios of the left neighboring area of the current frequency; greater than the mean value of the power spectrum ratios of the right neighboring area of the current frequency; or greater than the mean value of the power spectrum ratios of the current frequency area; and determine that the current frequency is a frequency corresponding to the peak when at least one of the conditions is met.

In a possible design, the coding parameter determining module is configured to: determine whether the power spectrum ratio of the current frequency meets the following conditions: greater than or equal to the first preset threshold; greater than the power spectrum ratio of the left neighboring frequency of the current frequency; and greater than the power spectrum ratio of the right neighboring frequency of the current frequency; and determine that the current frequency is a frequency corresponding to the peak when the conditions are met.

In a possible design, the coding parameter determining module is configured to: determine at least one of the quantity information of tonal components, the location information of the tonal component, the amplitude information of the tonal component, or the energy information of the tonal component based on at least one of the quantity information of peaks, the location information of the peak, the amplitude information of the peak, or the energy information of the peak in the current frequency area; and obtain the coding parameter based on at least one of the quantity information of tonal components, the location information of the tonal component, the amplitude information of the tonal component, or the energy information of the tonal component.

In a possible design, the at least a part of signals include a high frequency band signal of the current frame.

According to a third aspect, an embodiment of this application provides an audio signal coding apparatus, including a non-volatile memory and a processor coupled to each other. The processor invokes program code stored in the memory to perform the method according to any one of first aspect.

According to a fourth aspect, an embodiment of this application provides an audio signal coding and decoding device, including an encoder. The encoder is configured to perform the method according to any one of the first aspect.

According to a fifth aspect, an embodiment of this application provides a computer-readable storage medium, including a computer program. When the computer program is executed on a computer, the computer is enabled to perform the method according to any one of the first aspect.

According to a sixth aspect, an embodiment of this application provides a computer-readable storage medium, including a coded bitstream obtained by using the method according to any one of the first aspect.

According to a seventh aspect, this application provides a computer program product. The computer program product includes a computer program. When the computer program is executed by a computer, the method according to any one of the first aspect is performed.

According to an eighth aspect, this application provides a chip, including a processor and a memory. The memory is configured to store a computer program, and the processor is configured to invoke and run the computer program stored in the memory, to perform the method according to any one of the first aspect.

According to the audio signal coding method and apparatus in embodiments of this application, tonal component information of an audio signal is obtained based on a power spectrum ratio of the audio signal, and a coded bitstream is obtained based on the tonal component information. Because the power spectrum ratio is a ratio of a power spectrum to a mean power spectrum, and can better reflect a signal characteristic, the tonal component information can be accurately obtained, so that a decoder side can accurately obtain the audio signal based on the tonal component information. This improves quality of coding.

DESCRIPTION OF EMBODIMENTS

Terms such as "first" and "second" in embodiments of this application are only used for distinguishing description, but cannot be understood as indicating or implying relative importance or a sequence. In addition, terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. In addition, "at least one of the following items (pieces)" or a similar expression thereof means any combination of these items, including a single item (piece) or any combination of a plurality of items (pieces). For example, at least one of a, b, or c may represent: a, b, c, "a and b", "a and c", "b and c", or "a, b and c". Each of a, b, and c may be single or plural. Alternatively, some of a, b, and c may be single; and some of a, b, and c may be plural.

Figure 1:
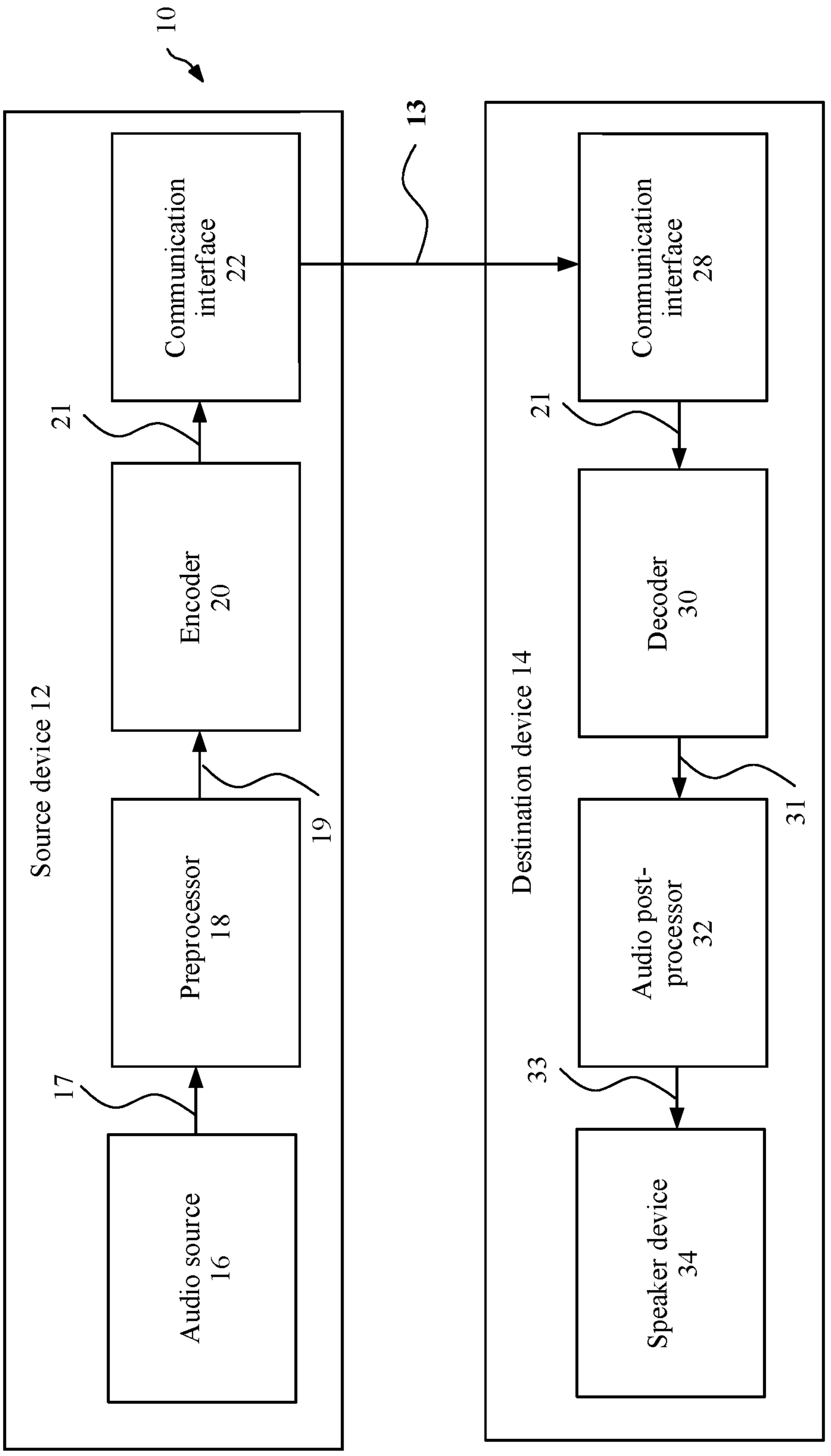
FIG. 1 is a schematic diagram of an example of an audio coding and decoding system according to an embodiment of this application.

The following describes a system architecture to which an embodiment of this application is applied. Refer to FIG. 1. FIG. 1 shows a schematic block diagram of an example of an audio coding and decoding system 10 to which an embodiment of this application is applied. As shown in FIG. 1, the audio coding and decoding system 10 may include a source device 12 and a destination device 14. The source device 12 generates coded audio data. Therefore, the source device 12 may be referred to as an audio coding apparatus. The destination device 14 can decode the coded audio data generated by the source device 12. Therefore, the destination device 14 may be referred to as an audio decoding apparatus. The source device 12, the destination device 14, or various implementation solutions of the source device 12 or the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a sound box, a digital media player, a video game console, an in-vehicle computer, a wireless communication device, or the like.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented over a link 13, and the destination device 14 may receive coded audio data from the source device 12 over the link 13. The link 13 may include one or more media or apparatuses capable of moving the coded audio data from the source device 12 to the destination device 14. In an example, the link 13 may include one or more communication media that enable the source device 12 to directly transmit the coded audio data to the destination device 14 in real time. In this example, the source device 12 can modulate the coded audio data according to a communication standard (for example, a wireless communication protocol), and can transmit modulated audio data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the internet). The one or more communication media may include a router, a switch, a base station, or another device that facilitates communication from the source device 12 to the destination device 14.

The source device 12 includes an encoder 20. Optionally, the source device 12 may further include an audio source 16, a preprocessor 18, and a communication interface 22. In a specific implementation, the encoder 20, the audio source 16, the preprocessor 18, and the communication interface 22 may be hardware components in the source device 12, or may be software programs in the source device 12. Descriptions are as follows.

The audio source 16 may include or may be a sound capture device of any type, configured to capture, for example, sound from the real world, and/or an audio generation device of any type. The audio source 16 may be a microphone configured to capture sound or a memory configured to store audio data, and the audio source 16 may further include any type of (internal or external) interface for storing previously captured or generated audio data and/or for obtaining or receiving audio data. When the audio source 16 is a microphone, the audio source 16 may be, for example, a local microphone or a microphone integrated into the source device. When the audio source 16 is a memory, the audio source 16 may be, for example, a local memory or a memory integrated into the source device. When the audio source 16 includes an interface, the interface may be, for example, an external interface for receiving audio data from an external audio source. For example, the external audio source is an external sound capture device such as a microphone, an external storage, or an external audio generation device. The interface may be any type of interface, for example, a wired or wireless interface or an optical interface, according to any proprietary or standardized interface protocol.

In this embodiment of this application, the audio data transmitted by the audio source 16 to the preprocessor 18 may also be referred to as raw audio data 17.

The preprocessor 18 is configured to receive and preprocess the raw audio data 17, to obtain preprocessed audio 19 or preprocessed audio data 19. For example, the preprocessing performed by the preprocessor 18 may include filtering or de-noising.

The encoder 20 (or referred to as an audio encoder 20) is configured to receive the preprocessed audio data 19, and is configured to perform the embodiments described below, to implement application of the audio signal coding method described in this application on an encoder side.

The communication interface 22 may be configured to receive coded audio data 21, and transmit the coded audio data 21 to the destination device 14 or any other device (for example, a memory) over the link 13 for storage or direct reconstruction. The other device may be any device used for decoding or storage. The communication interface 22 may be, for example, configured to encapsulate the coded audio data 21 into an appropriate format, for example, a data packet, for transmission over the link 13.

The destination device 14 includes a decoder 30. Optionally, the destination device 14 may further include a communication interface 28, an audio post-processor 32, and a speaker device 34. Descriptions are as follows.

The communication interface 28 may be configured to receive the coded audio data 21 from the source device 12 or any other source. The any other source is, for example, a storage device. The storage device is, for example, a coded audio data storage device. The communication interface 28 may be configured to transmit or receive the coded audio data 21 over the link 13 between the source device 12 and the destination device 14 or through any type of network. The link 13 is, for example, a direct wired or wireless connection. The any type of network is, for example, a wired or wireless network or any combination thereof, or any type of private or public network, or any combination thereof. The communication interface 28 may be, for example, configured to decapsulate the data packet transmitted through the communication interface 22, to obtain the coded audio data 21.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as coded audio data transmission.

The decoder 30 (or referred to as a decoder side 30) is configured to receive the coded audio data 21 and provide decoded audio data 31 or decoded audio 31. In some embodiments, the decoder 30 may be configured to perform each embodiment described below, to implement application of the audio signal coding method described in this application on a decoder side.

The audio post-processor 32 is configured to post-process the decoded audio data 31 (also referred to as reconstructed audio data) to obtain post-processed audio data 33. The post-processing performed by the audio post-processor 32 may include, for example, rendering or any other processing, and may be further configured to transmit the post-processed audio data 33 to the speaker device 34.

The speaker device 34 is configured to receive the post-processed audio data 33 to play audio to, for example, a user or a viewer. The speaker device 34 may be or may include any type of loudspeaker configured to play reconstructed sound.

Although FIG. 1 depicts the source device 12 and the destination device 14 as separate devices, a device embodiment may alternatively include both the source device 12 and the destination device 14 or functionality of both the source device 12 and the destination device 14, that is, the source device 12 or corresponding functionality, and the destination device 14 or corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) split of functionality of the different units or functionality of the source device 12 and/or the destination device 14 shown in FIG. 1 may vary depending on an actual device and application. The source device 12 and the destination device 14 may include any one of a wide range of devices, including any type of handheld or stationary device, for example, a notebook or laptop computer, a mobile phone, a smartphone, a pad or a tablet computer, a video camera, a desktop computer, a set-top box, a television set, a camera, a vehicle-mounted device, a sound box, a digital media player, a video game console, a video streaming transmission device (such as a content service server or a content distribution server), a broadcast receiver device, a broadcast transmitter device, smart glasses, or a smart watch, and may not use or may use any type of operating system.

The encoder 20 and the decoder 30 each may be implemented as any one of various appropriate circuits, for example, one or more microprocessors, digital signal processors (DSP), application-specific integrated circuits (aASIC), field-programmable gate arrays (FPGA), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

In some cases, the audio coding and decoding system 10 shown in FIG. 1 is merely an example, and the technologies of this application are applicable to audio coding settings (for example, audio coding or audio decoding) that do not necessarily include any data communication between a coding device and a decoding device. In another example, data may be retrieved from a local memory, transmitted in a streaming manner through a network, or the like. An audio coding device may code data and store data into the memory, and/or an audio decoding device may retrieve and decode the data from the memory. In some examples, coding and decoding are performed by devices that do not communicate with each other but simply code data to the memory and/or retrieve and decode the data from the memory.

The encoder may be a multi-channel encoder, for example, a stereo encoder, a 5.1-channel encoder, or a 7.1-channel encoder. Certainly, it may be understood that the foregoing encoder may also be a mono encoder.

The audio data may also be referred to as an audio signal. The audio signal in this embodiment of this application is an input signal in an audio coding device. The audio signal may include a plurality of frames. For example, a current frame may specifically refer to a frame in an audio signal. In embodiments of this application, audio signal coding and decoding of a current frame are used as an example for description. A previous frame or a next frame in the audio signal may be correspondingly coded and decoded based on an audio signal coding and decoding manner of the current frame. Coding and decoding processes of the previous frame or the next frame of the current frame in the audio signal are not described one by one. In addition, the audio signal in embodiments of this application may be a mono audio signal, or may be a multi-channel signal, for example, a stereo signal. The stereo signal may be an original stereo signal, may be a stereo signal including two channels of signals (a left channel signal and a right channel signal) included in a multi-channel signal, or may be a stereo signal including two channels of signals generated by at least three channels of signals included in a multi-channel signal. This is not limited in embodiments of this application.

Figure 2:
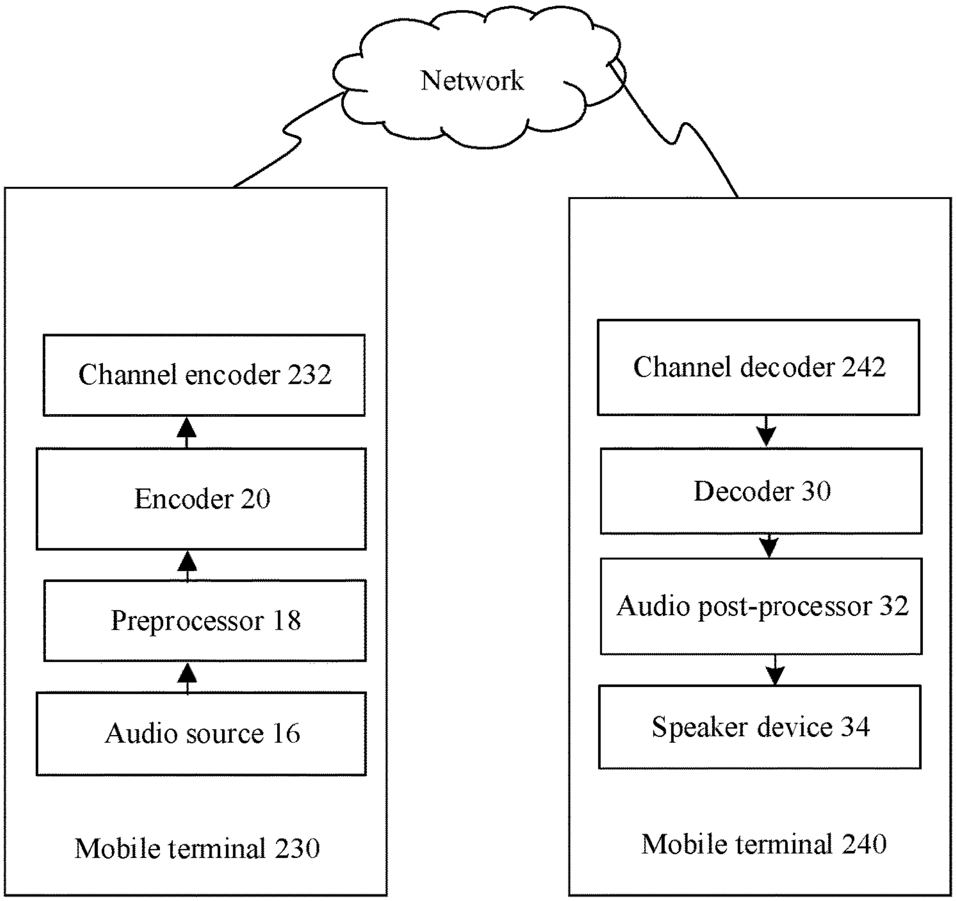
FIG. 2 is a schematic diagram of an audio coding application, according to an embodiment of this application.

For example, as shown in FIG. 2, this embodiment is described with an example in which an encoder 20 is disposed in a mobile terminal 230, a decoder 30 is disposed in a mobile terminal 240, the mobile terminal 230 and the mobile terminal 240 are electronic devices that are independent of each other and have an audio signal processing capability, for example, mobile phones, wearable devices, virtual reality (VR) devices, or augmented reality (AR) devices, and the mobile terminal 230 and the mobile terminal 240 are connected through a wireless or wired network.

Optionally, the mobile terminal 230 may include an audio source 16, a preprocessor 18, an encoder 20, and a channel encoder 232. The audio source 16, the preprocessor 18, the encoder 20, and the channel encoder 232 are connected.

Optionally, the mobile terminal 240 may include a channel decoder 242, a decoder 30, an audio post-processor 32, and a speaker device 34. The channel decoder 242, the decoder 30, the audio post-processor 32, and the speaker device 34 are connected.

After obtaining an audio signal through the audio source 16, the mobile terminal 230 preprocesses the audio by using the preprocessor 18, codes the audio signal by using the encoder 20 to obtain a coded bitstream, and then codes the coded bitstream by using the channel encoder 232 to obtain a transmission signal.

The mobile terminal 230 sends the transmission signal to the mobile terminal 240 through a wireless or wired network.

After receiving the transmission signal, the mobile terminal 240 decodes the transmission signal by using the channel decoder 242 to obtain a coded bitstream; decodes the coded bitstream by using the decoder 30 to obtain an audio signal; processes the audio signal by using the audio post-processor 32, and then plays the audio signal by using the speaker device 34. It may be understood that the mobile terminal 230 may also include functional modules included in the mobile terminal 240, and the mobile terminal 240 may also include functional modules included in the mobile terminal 230.

Figure 3:
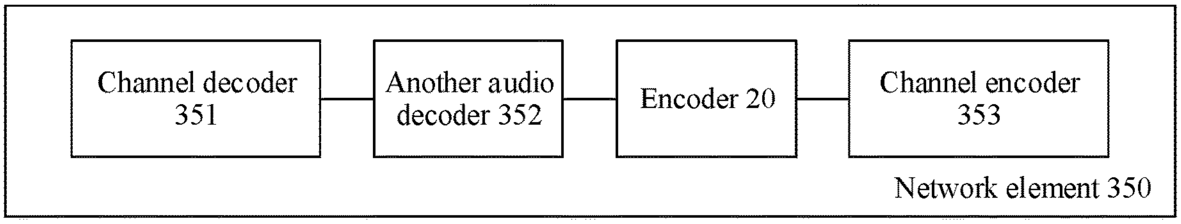
FIG. 3 is a schematic diagram of an audio coding application, according to an embodiment of this application.

For example, as shown in FIG. 3, an example in which an encoder 20 and a decoder 30 are disposed in a network element 350 that has an audio signal processing capability in a same core network or wireless network is used for description. The network element 350 may implement transcoding, for example, convert a coded bitstream of another audio encoder (non-multi-channel encoder) into a coded bitstream of a multi-channel encoder. The network element 350 may be a media gateway, a transcoding device, a media resource server, or the like of a radio access network or a core network.

Optionally, the network element 350 includes a channel decoder 351, another audio decoder 352, an encoder 20, and a channel encoder 353. The channel decoder 351, the another audio decoder 352, the encoder 20, and the channel encoder 353 are connected.

After receiving a transmission signal sent by another device, the channel decoder 351 decodes the transmission signal to obtain a first coded bitstream; decodes the first coded bitstream by using the another audio decoder 352 to obtain an audio signal; codes the audio signal by using the encoder 20 to obtain a second coded bitstream; and codes the second coded bitstream by using the channel encoder 353 to obtain the transmission signal. That is, the first coded bitstream is converted into the second coded bitstream.

The another device may be a mobile terminal having an audio signal processing capability, or may be another network element having an audio signal processing capability. This is not limited in this embodiment.

Optionally, in this embodiment of this application, a device on which the encoder 20 is installed may be referred to as an audio coding device. In actual implementation, the audio coding device may also have an audio decoding function. This is not limited in this embodiment of this application.

Optionally, in this embodiment of this application, a device on which the decoder 30 is installed may be referred to as an audio decoding device. During actual implementation, the audio decoding device may also have an audio coding function. This is not limited in this embodiment of this application.

The foregoing encoder may perform the audio signal coding method in embodiments of this application, to obtain tonal component information of an audio signal based on a power spectrum ratio of the audio signal, and obtain a coded bitstream based on the tonal component information. Because the power spectrum ratio is a ratio of a power spectrum to a mean power spectrum, and can better reflect a signal characteristic, the tonal component information can be accurately obtained, so that a decoder side can accurately reconstruct the audio signal based on the tonal component information. This improves quality of coding.

For example, the foregoing encoder or a core encoder inside the encoder obtains a current frame of an audio signal, and obtains a coding parameter based on a power spectrum ratio of at least one frequency in at least one frequency area of at least a part of signals of the current frame. The coding parameter indicates tonal component information of the at least a part of signals. The tonal component information includes at least one of location information of a tonal component, quantity information of tonal components, amplitude information of the tonal component, or energy information of the tonal component. Bitstream multiplexing is performed on the coding parameter to obtain a coded bitstream. For a specific implementation thereof, refer to the following specific explanation and description of the embodiment shown in FIG. 4.

Figure 4:
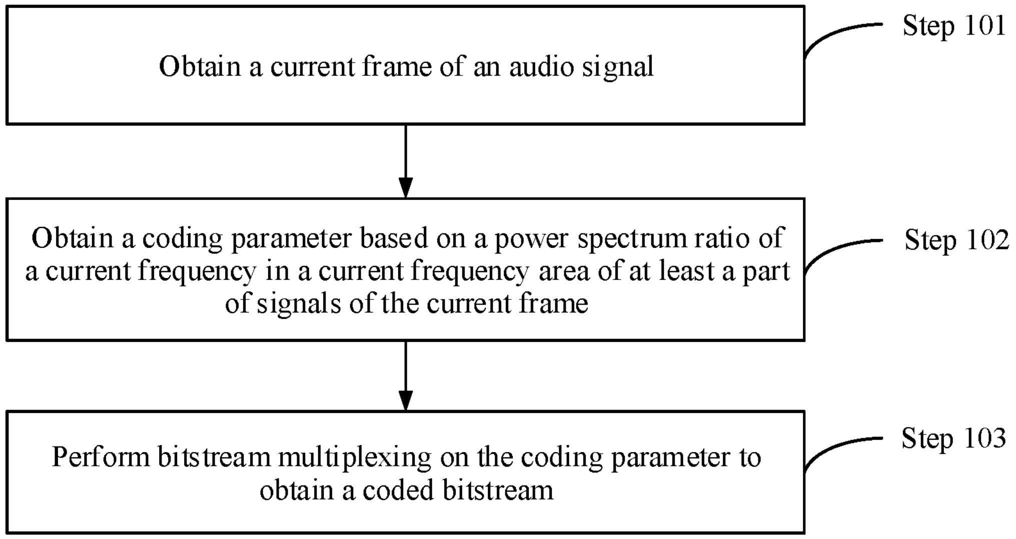
FIG. 4 is a flowchart of an audio signal coding method, according to an embodiment of this application.

FIG. 4 is a flowchart of an audio signal coding method according to an embodiment of this application. This embodiment of this application may be executed by the foregoing encoder or a core encoder inside the encoder. As shown in FIG. 4, the method in this embodiment may include the following steps.

Step 101: Obtain a current frame of an audio signal.

The current frame may be any frame in the audio signal. In other words, processing in step 101 to step 103 in this embodiment of this application may be performed on any frame or each frame in the audio signal.

Step 102: Obtain a coding parameter based on a power spectrum ratio of a current frequency in a current frequency area of at least a part of signals of the current frame.

The coding parameter indicates tonal component information of the at least a part of signals. The tonal component information may include at least one of location information of a tonal component, quantity information of tonal components, amplitude information of the tonal component, or energy information of the tonal component. The power spectrum ratio of the current frequency is a ratio of a value of a power spectrum of the current frequency to a mean value of power spectrums in the current frequency area. The mean value of the power spectrums may also be referred to as a mean power spectrum.

The at least a part of signals of the current frame are explained. The at least a part of signals of the current frame may be a high frequency band signal of the current frame, a low frequency band signal of the current frame, a full frequency band signal of the current frame, a signal in one or more frequency areas of the current frame, a part of signals of high frequency band signals, for example, signals in one or more frequency areas of the high frequency band signals, or a part of signals of low frequency band signals, for example, signals in one or more frequency areas of the low frequency band signals. For specific explanations and descriptions of the high frequency band signal and the low frequency band signal, refer to the following explanations and descriptions of step 201 in the embodiment shown in FIG. 5.

The current frequency area of the at least a part of signals may be any frequency area of the at least a part of signals. The current frequency may be any frequency in the current frequency area.

In an implementable, peak search may be performed in the current frequency area based on the power spectrum ratio of the current frequency, to obtain at least one of quantity information of peaks, location information of the peak, amplitude information of the peak, or energy information of the peak in the current frequency area. The coding parameter is obtained based on the at least one of the quantity information of peaks, the location information of the peak, the amplitude information of the peak, or the energy information of the peak in the current frequency area. The peak may be a power spectrum ratio peak or a power spectrum peak. The power spectrum ratio peak and the power spectrum peak correspond to a same frequency, and the power spectrum ratio peak can indicate the power spectrum peak.

In some embodiments, the peak in this embodiment of this application may alternatively be an energy spectrum peak or an energy spectrum ratio peak. The energy spectrum ratio peak and the energy spectrum peak correspond to a same frequency. Therefore, the energy spectrum ratio peak can indicate the energy spectrum peak.

Because a dynamic range of the energy spectrum/power spectrum is large, peak search efficiency can be improved by using the power spectrum ratio/energy spectrum ratio.

In other words, the power spectrum ratio in this embodiment of this application may alternatively be an energy spectrum ratio. The energy spectrum ratio is a ratio of energy of a frequency in the current frequency area to mean energy of the current frequency area. For example, the coding parameter is obtained based on the energy spectrum ratio of the at least one frequency in the at least one frequency area of the at least a part of signals of the current frame.

Step 103: Perform bitstream multiplexing on the coding parameter to obtain a coded bitstream.

The coded bitstream may be a payload bitstream. The payload bitstream may carry specific information of each frame of the audio signal, for example, may carry tonal component information of each frame.

In some embodiments, the coded bitstream may further include a configuration bitstream, and the configuration bitstream may carry configuration information shared by all frames in the audio signal. The payload bitstream and the configuration bitstream may be independent of each other, or may be included in a same bitstream, that is, the payload bitstream and the configuration bitstream may be different parts in a same bitstream.

The encoder sends the coded bitstream to a decoder, and the decoder performs bitstream demultiplexing on the coded bitstream, to obtain the coding parameter, and further accurately obtain the current frame of the audio signal.

In this embodiment, the tonal component information of the at least a part of signals is obtained by using the power spectrum ratio of the at least a part of signals of the current frame of the audio signal, and the coded bitstream is obtained based on the tonal component information. Because the power spectrum ratio is a ratio of a power spectrum to a mean value of the power spectrums, and can better reflect a signal characteristic, the tonal component information can be accurately obtained, so that a decoder side can accurately reconstruct the at least a part of signals of the current frame based on the tonal component information, and further accurately obtain the current frame of the audio signal. This improves quality of coding.

The following describes the audio signal coding method in embodiments of this application by using an example embodiment in which tonal component information is obtained by using a power spectrum ratio of a high frequency band signal.

Figure 5:
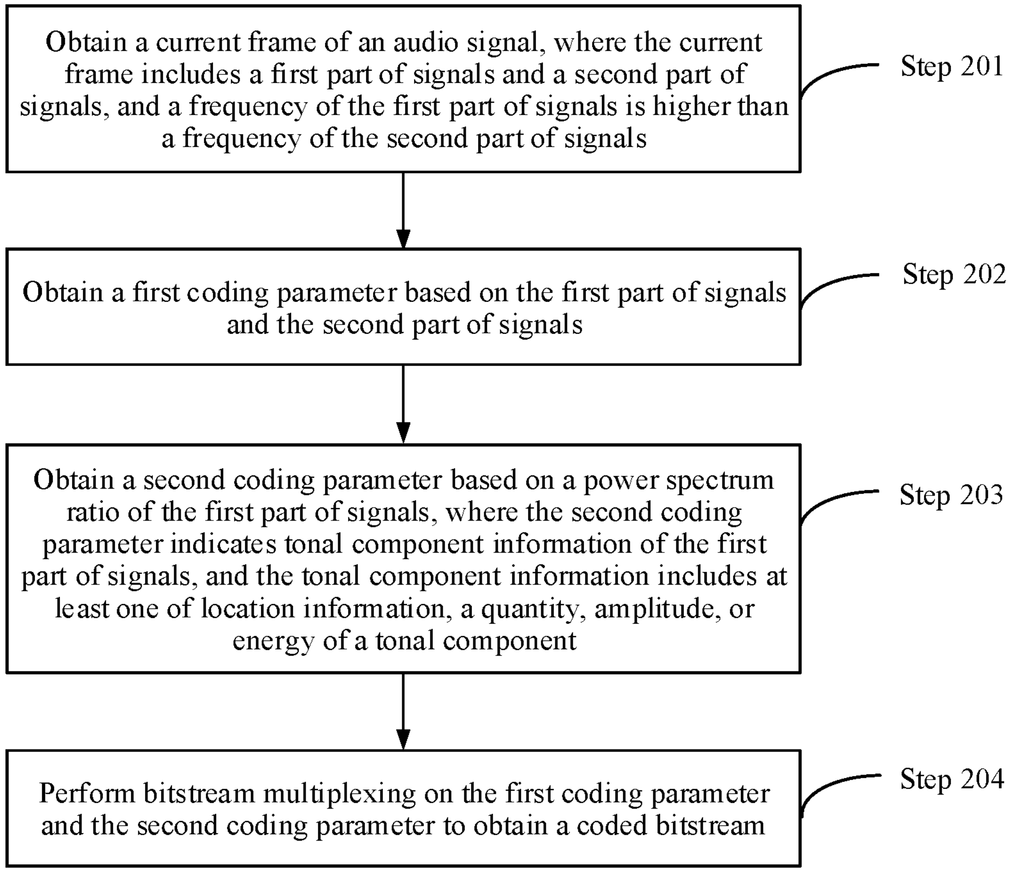
FIG. 5 is a flowchart of another audio signal coding method, according to an embodiment of this application.

FIG. 5 is a flowchart of an audio signal coding method according to an embodiment of this application. This embodiment of this application may be executed by the foregoing encoder or a core encoder inside the encoder. As shown in FIG. 5, the method in this embodiment may include the following steps.

Step 201: Obtain a current frame of an audio signal. The current frame includes a first part of signals and a second part of signals, and a frequency of the first part of signals is higher than a frequency of the second part of signals.

The current frame may be any frame in the audio signal, the first part of signals may also be referred to as a high frequency band signal, and the second part of signals may also be referred to as a low frequency band signal. Division of the high frequency band signal and the low frequency band signal in the current frame may be determined by using a frequency band threshold. In the current frame, a part higher than the frequency band threshold is a high frequency band signal, and a part lower than the frequency band threshold is a low frequency band signal. The frequency band threshold may be determined based on transmission bandwidth and data processing capabilities of an encoder and a decoder. This is not specifically limited herein.

For example, when the current frame is a wideband signal of 0-8 kHz, the frequency band threshold may be 4 kHz. When the current frame is an ultra-wideband signal of 0-16 kHz, the frequency band threshold may be 8 kHz.

Step 202: Obtain a first coding parameter based on the first part of signals and the second part of signals.

The first coding parameter is used by a decoder side to reconstruct the current frame of the audio signal. For example, the first coding parameter may include any one or a combination of a time domain noise shaping parameter, a frequency domain noise shaping parameter, a spectrum quantization parameter, or bandwidth extension information.

The bandwidth extension information is used as an example. The bandwidth extension information may be determined in a unit of a frequency area (tile) or a frequency band (SFB). In other words, the bandwidth extension information included in the first coding parameter may be bandwidth extension information corresponding to one or more frequency areas (tile), or one or more frequency bands (SFB) correspond to one piece of bandwidth extension information, or may include both bandwidth extension information corresponding to a frequency area (tile) and one piece of bandwidth extension information corresponding to a frequency band (SFB).

A bandwidth extension upper limit corresponding to the bandwidth extension information may be determined in a process of obtaining the bandwidth extension information, or may be obtained through presetting or table lookup.

Similarly, a quantity of frequency areas of bandwidth extension corresponding to the bandwidth extension information may also be determined in the process of obtaining the bandwidth extension information, or may be obtained through presetting or table lookup.

The bandwidth extension upper limit corresponding to the bandwidth extension information may be one or more of a highest frequency, a highest frequency number, a highest frequency band number, or a highest frequency area number of bandwidth extension.

For example, in a coding process, a high frequency band may be divided into K frequency areas (tile), each frequency area is divided into N frequency bands (SFB), and bandwidth extension information is obtained in a granularity of a frequency area (tile) or a frequency band (SFB). Alternatively, the high frequency band is divided into K frequency areas (tile), each frequency area is divided into one or more frequency bands (SFB), each band is further divided into one or more sub-bands, and a parameter, for example, the spectrum quantization parameter, is obtained in a granularity of a frequency area (tile), a frequency band (SFB), or a sub-band.

Step 203: Obtain a second coding parameter based on a power spectrum ratio of the first part of signals. The second coding parameter indicates tonal component information of the first part of signals, and the tonal component information includes at least one of location information, a quantity, amplitude, or energy of a tonal component.

The second coding parameter is used by the decoder side to reconstruct the first part of signals, that is, reconstruct the high frequency band signal of the current frame. The second coding parameter may include a high frequency band parameter of the current frame, and the high frequency band parameter may include tonal component information of the high frequency band signal. A high frequency band corresponding to the high frequency band signal includes at least one frequency area, and one frequency area includes at least one sub-band. The high frequency band parameter of the current frame may include a high frequency band parameter of one or more frequency domain areas, that is, tonal component information of one or more frequency areas. A quantity of frequency areas in which the high frequency band parameter needs to be obtained may be given in advance, may be obtained through calculation according to a specific algorithm, or may be obtained from a bitstream. This is not limited in this embodiment of this application.

A process of obtaining the second coding parameter of the current frame based on the high frequency band signal may be performed based on the frequency area division and/or sub-band division of the high frequency band corresponding to the high frequency band signal.

In this embodiment of this application, a peak of the high frequency band signal may be determined based on the power spectrum ratio of the first part of signals (the high frequency band signal), the tonal component is determined based on the peak, and the second coding parameter is obtained based on at least one of the location information, the quantity information, the amplitude information, or the energy information of the tonal component.

The power spectrum ratio of the high frequency band signal is a ratio of a power spectrum of the high frequency band signal to a mean value of power spectrums of a frequency area in which the high frequency band signal is located. For example, the power spectrum ratio of the high frequency band signal includes a ratio of a power spectrum of at least one frequency area of the high frequency band signal to a mean power spectrum, where the mean power spectrum is a mean power spectrum of the at least one frequency area of the high frequency band signal.

Step 204: Perform bitstream multiplexing on the first coding parameter and the second coding parameter to obtain a coded bitstream.

The encoder sends the coded bitstream to a decoder, and the decoder performs bitstream demultiplexing on the coded bitstream, to obtain the first coding parameter and the second coding parameter, and further accurately obtain the current frame of the audio signal. For specific explanations and descriptions of the coded bitstream, refer to the explanations and descriptions of the coded bitstream in step 103. Details are not described herein again.

In this embodiment of this application, the tonal component information of the high frequency band signal is obtained based on the power spectrum ratio of the high frequency band signal of the audio signal, and the coded bitstream is obtained based on the tonal component information. Because the power spectrum ratio is a ratio of a power spectrum to a mean power spectrum, and can better reflect a signal characteristic, the tonal component information can be accurately obtained, so that a decoder side can accurately reconstruct the high frequency band signal based on the tonal component information, and the audio signal can be accurately obtained. This improves quality of coding.

Figure 6:
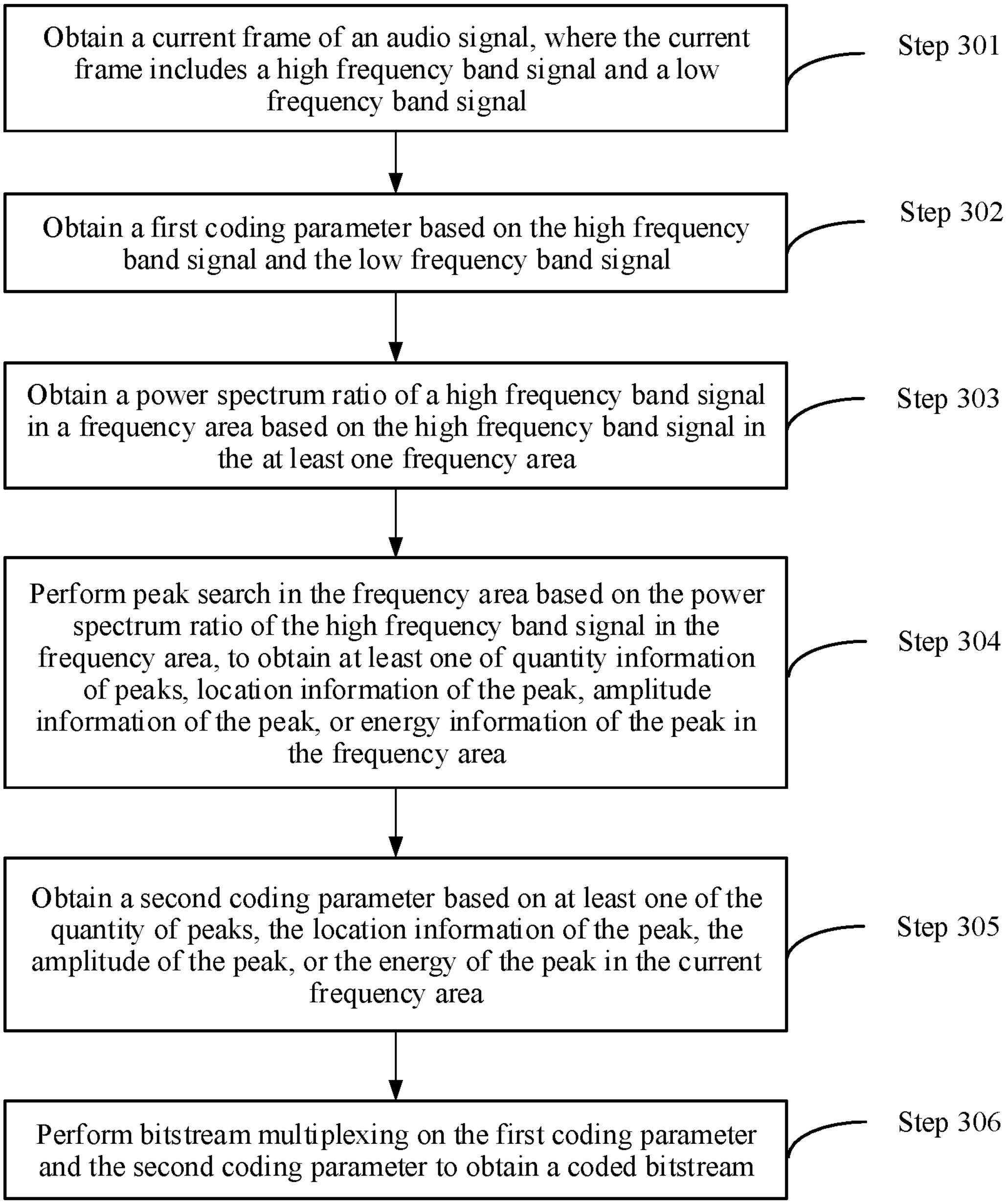
FIG. 6 is a flowchart of still another audio signal coding method, according to an embodiment of this application.

FIG. 6 is a flowchart of another audio signal coding method according to an embodiment of this application. This embodiment of this application may be executed by the foregoing encoder or a core encoder inside the encoder, and this embodiment is a specific implementation of the embodiment shown in FIG. 5. As shown in FIG. 6, the method in this embodiment may include the following steps.

Step 301: Obtain a current frame of an audio signal. The current frame includes a high frequency band signal and a low frequency band signal.

Step 302: Obtain a first coding parameter based on the high frequency band signal and the low frequency band signal.

The high frequency band signal includes a high frequency band signal in at least one frequency area. For specific explanations and descriptions of step 301 and step 302, refer to step 201 and step 202 of the embodiment shown in FIG. 5. Details are not described herein again.

Step 303: Obtain a power spectrum ratio of a high frequency band signal in a frequency area based on the high frequency band signal in the at least one frequency area.

For example, one frequency area (for example, a current frequency area, where the current frequency area may be any frequency area in the high frequency band signal) is used as an example for explanation and description, and a same operation may be performed on each frequency domain area. A power spectrum of a high frequency band signal in the frequency area is obtained based on the high frequency band signal in the frequency area. The power spectrum of the high frequency band signal may include a power spectrum of each frequency in the frequency area. Determine a mean power spectrum of the frequency area based on the power spectrum of the high frequency band signal in the frequency area. A power spectrum ratio of the high frequency band signal in the frequency area is determined based on the power spectrum of the high frequency band signal in the frequency area and the mean power spectrum of the frequency area. The power spectrum ratio is the power spectrum of the high frequency band signal in the frequency area divides the mean power spectrum of the frequency area.

For example, a mean power spectrum of a frequency area (tile) may be calculated according to the following formula (1).

$$\text{mean\_powerspec} = \frac{1}{\text{tile\_width}} \sum_{sb} \text{power Spectrum}[sb] \tag{1}$$

powerSpectrum is a power spectrum of the frequency area, tile_width is a width (a quantity of frequencies) of the frequency area (tile), and mean_powerspec is a mean power spectrum, which is also referred to as a mean value of the power spectrums.

A ratio of a power spectrum of each frequency in a frequency area (tile) to a mean power spectrum may be calculated according to the following formula (2). The power spectrum ratio may be represented by a logarithm with a base 10:

$$\text{peak\_ratio}[sb - tile[p]] = 10\log_{10}\left[\frac{powerSpectrum[sb]}{\text{mean\_powerspec}} + A\right] \tag{2}$$

tile[p] is a start frequency of the $p^{th}$ tile, sb is a frequency number, peak_ratio represents a power spectrum ratio, powerSpectrum[sb] is a power spectrum of a frequency sb, and mean_powerspec is a mean power spectrum of a frequency area in which the frequency sb is located. A is a minimum value that ensures an effective logarithmic operation, for example, $A=1.0e^{-18}$.

For the frequency number, an example in which frequency numbers of frequencies in a frequency domain area ascend from a low frequency (left) to a high frequency (right) is used for description in this embodiment of this application.

Step 304: Perform peak search in the frequency area based on the power spectrum ratio of the high frequency band signal in the frequency area, to obtain at least one of quantity information of peaks, location information of the peak, amplitude information of the peak, or energy information of the peak in the frequency area.

In this embodiment of this application, peak search is performed based on the power spectrum ratio. Because the power spectrum ratio can better reflect a signal characteristic, the peak obtained through search is more accurate. Further, the tonal component is determined based on the peak, and the tonal component can be more accurate. Therefore, the tonal component information can be accurately obtained, so that a decoder side can reconstruct the high frequency band signal more accurately based on the tonal component information.

An area of peak search may be an area in the frequency area excluding frequencies at both ends of the frequency area, may be a part of the frequency area, or may be all frequencies in the frequency area. It may be flexibly set according to a requirement. For peak search in all frequencies in the frequency area, in some embodiments, when comparison is made with a power spectrum ratio of a left neighboring frequency, a leftmost frequency in the frequency area may be ignored, that is, peak search is not performed on the leftmost frequency. In some embodiments, when comparison is made with a power spectrum ratio of a right neighboring frequency, a rightmost frequency in the frequency area may be ignored, that is, peak search is not performed on the rightmost frequency.

For example, the peak meets at least one of the following conditions, and the conditions are for searching for a peak in the high frequency band signal.

The conditions may include the following (1) to (6).

(1) A power spectrum ratio of a frequency at which a peak is located is greater than or equal to a first preset threshold.

In other words, the power spectrum ratio of the frequency at which the peak of the high frequency band signal is located is greater than or equal to the first preset threshold, and the first preset threshold may be flexibly set according to a requirement. One frequency area is used as an example.

A frequency whose power spectrum ratio is greater than or equal to the first preset threshold is searched for among all frequencies in the frequency area, and the frequency is a frequency at which the peak in the frequency area is located.

(2) The power spectrum ratio of the frequency at which the peak is located is greater than a power spectrum ratio of a left neighboring frequency of the frequency at which the peak is located.

In other words, the power spectrum ratio of the frequency at which the peak of the high frequency band signal is located is greater than the power spectrum ratio of the left neighboring frequency of the frequency at which the peak is located. The left neighboring frequency is adjacent to the frequency at which the peak is located, and has a frequency number smaller than that of the frequency at which the peak is located. For example, the frequency number of the frequency at which the peak is located is sb, and the frequency number of the left neighboring frequency of the frequency at which the peak is located is sb−1. Certainly, it may be understood that the frequency number of the left neighboring frequency of the frequency at which the peak is located may alternatively be sb−2, sb−3, or the like. It may be properly set according to a requirement. The left neighboring frequency of the frequency at which the peak is located may alternatively be a plurality of frequencies. For example, frequency numbers of the left neighboring frequency of the frequency at which the peak is located include sb−1, sb−2, and sb−3.

(3) The power spectrum ratio of the frequency at which the peak is located is greater than a power spectrum ratio of a right neighboring frequency of the frequency at which the peak is located.

In other words, the power spectrum ratio of the frequency at which the peak of the high frequency band signal is located is greater than the power spectrum ratio of the right neighboring frequency of the frequency at which the peak is located. The right neighboring frequency is adjacent to the frequency at which the peak is located, and has a frequency number greater than that of the frequency at which the peak is located. For example, the frequency number of the frequency at which the peak is located is sb, and the frequency number of the right neighboring frequency of the frequency at which the peak is located is sb+1. Certainly, it may be understood that the frequency number of the right neighboring frequency of the frequency at which the peak is located may alternatively be sb+2, sb+3, or the like. It may be properly set according to a requirement. The right neighboring frequency of the frequency at which the peak is located may alternatively be a plurality of frequencies. For example, frequency numbers of the right neighboring frequency of the frequency at which the peak is located include sb+1, sb+2, and sb+3.

(4) The power spectrum ratio of the frequency at which the peak is located is greater than a mean value of power spectrum ratios of a left neighboring area of the frequency at which the peak is located. The left neighboring area includes N_neighbor_l frequencies whose frequency numbers are smaller than the frequency number of the frequency at which the peak is located, and N_neighbor_l is any natural number.

In other words, the power spectrum ratio of the frequency at which the peak of the high frequency band signal is located is greater than the mean value of the power spectrum ratios of the left neighboring area of the frequency at which the peak is located. Alternatively, a difference between the power spectrum ratio of the frequency at which the peak of the high frequency band signal is located and the mean value of the power spectrum ratios of the left neighboring area of the frequency at which the peak is located is greater than a second preset threshold. The second preset threshold may be flexibly set according to a requirement. The left neighboring area includes N_neighbor_l frequencies whose frequency numbers are smaller than the frequency number of the frequency at which the peak is located. For example, the frequency number of the frequency at which the peak is located is sb, and the left neighboring area of the frequency at which the peak is located includes frequency numbers sb−N_neighbor_l to sb−1.

(5) The power spectrum ratio of the frequency at which the peak is located is greater than a mean value of power spectrum ratios of a right neighboring area of the frequency at which the peak is located. The right neighboring area includes N_neighbor_r frequencies whose frequency numbers are greater than the frequency number of the frequency at which the peak is located, and N_neighbor_r is any natural number.

In other words, the power spectrum ratio of the frequency at which the peak of the high frequency band signal is located is greater than the mean value of the power spectrum ratios of the right neighboring area of the frequency at which the peak is located. Alternatively, a difference between the power spectrum ratio of the frequency at which the peak of the high frequency band signal is located and the mean value of the power spectrum ratios of the right neighboring area of the frequency at which the peak is located is greater than a third preset threshold. The third preset threshold may be flexibly set according to a requirement. The right neighboring area includes N_neighbor_r frequencies whose frequency numbers are greater than the frequency number of the frequency at which the peak is located. For example, the frequency number of the frequency at which the peak is located is sb, and the right neighboring area of the frequency at which the peak is located includes frequency numbers sb+1 to sb+N_neighbor_r.

(6) The power spectrum ratio of the frequency at which the peak is located is greater than a mean value of power spectrum ratios of the frequency area in which the peak is located.

In other words, the power spectrum ratio of the frequency at which the peak of the high frequency band signal is located is greater than the mean value of the power spectrum ratios of the frequency area in which the peak is located. That is, the frequency at which the peak is located is a frequency whose power spectrum ratio is higher than the mean value of the power spectrum ratios of the frequency area in which the peak is located. Alternatively, a difference between the power spectrum ratio of the frequency at which the peak of the high frequency band signal is located and the mean value of the power spectrum ratios of the frequency area in which the peak is located is greater than a fourth preset threshold. The fourth preset threshold may be flexibly set according to a requirement.

Certainly, it may be understood that the foregoing conditions may further include another item. In this embodiment of this application, the foregoing items (1) to (6) are used as examples for description. This is not limited in this embodiment of this application.

In an implementable, at least one of a mean value of the power spectrum ratios of the high frequency band signal in the frequency area, a mean value of power spectrum ratios of a left neighboring area of each frequency of the high frequency band signal in the frequency area, or a mean value of power spectrum ratios of a right neighboring area of each frequency of the high frequency band signal in the frequency area may be determined based on the power spectrum ratio of the high frequency band signal in the frequency area. Peak search is performed in the frequency area based on at least one of a power spectrum ratio of each frequency of the high frequency band signal in the frequency area, a power spectrum ratio of a left neighboring frequency of each frequency, a power spectrum ratio of a right neighboring frequency of each frequency, the mean value of the power spectrum ratios of the high frequency band signal in the frequency area, the mean value of the power spectrum ratios of the left neighboring area of each frequency of the high frequency band signal in the frequency area, or the mean value of the power spectrum ratios of the right neighboring area of each frequency of the high frequency band signal in the frequency area, to obtain at least one of the quantity of peaks, the location information of the peak, the amplitude of the peak, or the energy of the peak in the frequency area.

For example, it is determined whether the power spectrum ratio of each frequency of the high frequency band signal in the frequency area meets at least one of the following conditions: greater than or equal to the first preset threshold; greater than the power spectrum ratio of the left neighboring frequency of the frequency; greater than the power spectrum ratio of the right neighboring frequency of the frequency; greater than the mean value of the power spectrum ratios of the left neighboring area of the frequency, where the left neighboring area includes N_neighbor_l frequencies whose frequency numbers are smaller than the frequency number of the frequency, and N_neighbor_l is any natural number; greater than the mean value of the power spectrum ratios of the right neighboring area of the frequency, where the right neighboring area includes N_neighbor_r frequencies whose frequency numbers are greater than the frequency number of the frequency, and N_neighbor_r is any natural number; greater than the mean value of the power spectrum ratios of the frequency area; the difference between the power spectrum ratio of the frequency and the mean value of the power spectrum ratios of the left neighboring area of the frequency is greater than the second preset threshold; the difference between the power spectrum ratio of the frequency and the mean value of the power spectrum ratios of the right neighboring area of the frequency is greater than the third preset threshold; or the difference between the power spectrum ratio of the frequency and the mean value of the power spectrum ratios of the frequency area in which the frequency is located is greater than the fourth preset threshold. When the condition is met, it is determined that the frequency is a frequency corresponding to the peak, and at least one of the quantity of peaks, the location information of the peak, the amplitude of the peak, or the energy of the peak in the frequency area is obtained.

For another example, it is determined whether the power spectrum ratio of each frequency of the high frequency band signal in the frequency area meets all of the following conditions: greater than or equal to the first preset threshold; greater than the power spectrum ratio of the left neighboring frequency of the frequency; greater than the power spectrum ratio of the right neighboring frequency of the frequency; the difference between the power spectrum ratio of the frequency and the mean value of the power spectrum ratios of the left neighboring area of the frequency is greater than the second preset threshold, where the left neighboring area includes N_neighbor_l frequencies whose frequency numbers are smaller than the frequency number of the frequency, and N_neighbor_l is any natural number; the difference between the power spectrum ratio of the frequency and the mean value of the power spectrum ratios of the right neighboring area of the frequency is greater than the third preset threshold, where the right neighboring area includes N_neighbor_r frequencies whose frequency numbers are greater than the frequency number of the frequency, and N_neighbor_r is any natural number; and the difference between the power spectrum ratio of the frequency and the mean value of the power spectrum ratios of the frequency area in which the frequency is located is greater than the fourth preset threshold. When the conditions are met, it is determined that the frequency is a frequency corresponding to the peak, and at least one of the quantity of peaks, the location information of the peak, the amplitude of the peak, or the energy of the peak in the frequency area is obtained.

For example, peak search is performed on frequencies in a range of [1, tile_width−2], the first preset threshold is 2.0f, the second preset threshold is 12, the third preset threshold is 12, and the fourth preset threshold is 15, where tile_width is width of the frequency area. It is determined whether the following conditions are included:

$$\text{peak\_ratio}[sb] \geq 2.0\text{f}; \quad \text{Condition 1 (Cond1):}$$

$$\text{peak\_ratio}[sb] > \text{peak\_ratio}[sb-1] \text{ and peak\_ratio}[sb] > \text{peak\_ratio}[sb+1]; \quad \text{Condition 2 (Cond2):}$$

$$\text{peak\_ratio}[sb] > \text{neighbor\_}l+12; \quad \text{Condition 3 (Cond3):}$$

$$\text{peak\_ratio}[sb] > \text{neighbor\_}r+12; \text{ and} \quad \text{Condition 4 (Cond4):}$$

$$\text{peak\_ratio}[sb] > \text{mean\_ratio}+25. \quad \text{Condition 5 (Cond5):}$$

The frequency that meets all the foregoing conditions is a frequency corresponding to the peak. For specific explanations and descriptions of mean_ratio, neighbor_l, and neighbor_r, refer to the following formulas (3) to (5).

For another example, it is determined whether the power spectrum ratio of each frequency of the high frequency band signal in the frequency area meets all of the following conditions: greater than or equal to the first preset threshold; greater than the power spectrum ratio of the left neighboring frequency of the frequency; and greater than the power spectrum ratio of the right neighboring frequency of the frequency. When the conditions are met, it is determined that the frequency is a frequency corresponding to the peak, and at least one of the quantity of peaks, the location information of the peak, the amplitude of the peak, or the energy of the peak in the frequency area is obtained.

Alternatively, the determining condition for peak search may be another condition or a combination of the foregoing conditions. In this embodiment of this application, the foregoing several determining manners are used as examples for description, and this is not limited thereto.

Peak search may be performed on each frequency in the entire frequency area, may be performed only in an area excluding a start frequency and an end frequency in the frequency area, or may be performed in a predefined area in the frequency area for peak search. Areas for peak search in different frequency areas may be the same or different.

The amplitude information of the peak or the energy information of the peak may include a power spectrum ratio of the peak, a power spectrum of the peak, energy of the peak, and an energy ratio of the peak. The energy ratio is spectrum energy of a signal in a frequency area to mean energy. The mean energy is a mean value of spectrum energy of signals in the frequency area.

Step 305: Obtain a second coding parameter based on at least one of the quantity of peaks, the location information of the peak, the amplitude of the peak, or the energy of the peak in the current frequency area.

Optionally, in some embodiments, some frequencies may be selected from frequencies that meet the foregoing conditions as frequencies at which peaks after screening are located. At least one of quantity information, location information, amplitude information, or energy information of a tonal component is determined based on at least one of the quantity information, the location information, the amplitude information, or the energy information of the peaks after screening, and the second coding parameter is obtained based on at least one of the quantity information, the location information, the amplitude information, or the energy information of the tonal component.

For example, in a peak screening manner, the peak of the high frequency band signal includes N peaks. In this embodiment of this application, M peaks may be further selected as peaks after screening based on power spectrum ratios, energy, or amplitude of the N peaks. N and M are any positive integers, and N≥M. For example, M peaks whose energy or amplitude are relatively high may be selected based on the energy or amplitude of the N peaks, that is, the energy or amplitude of the M peaks are higher than energy or amplitude of a peak other than the M peaks in the N peaks.

The amplitude information of the tonal component or the energy information of the tonal component may include a power spectrum ratio of the tonal component, a power spectrum of the tonal component, energy of the tonal component, and an energy ratio of the tonal component. The energy ratio is spectrum energy of a signal in a frequency area to mean energy. The mean energy is a mean value of spectrum energy of signals in the frequency area.

Step 306: Perform bitstream multiplexing on the first coding parameter and the second coding parameter to obtain a coded bitstream.

The encoder sends the coded bitstream to a decoder, and the decoder performs bitstream demultiplexing on the coded bitstream, to obtain the first coding parameter and the second coding parameter, and further accurately obtain the current frame of the audio signal.

In this embodiment, peak search is performed based on the power spectrum ratio of the high frequency band signal of the audio signal. Because the power spectrum ratio can better reflect a signal characteristic, the peak obtained through search is more accurate. Further, the tonal component is determined based on the peak, and the tonal component can be more accurate. Therefore, the tonal component information can be accurately obtained, so that a decoder side can reconstruct the high frequency band signal more accurately based on the tonal component information, and the audio signal can be accurately obtained. This improves quality of coding.

Figure 7:
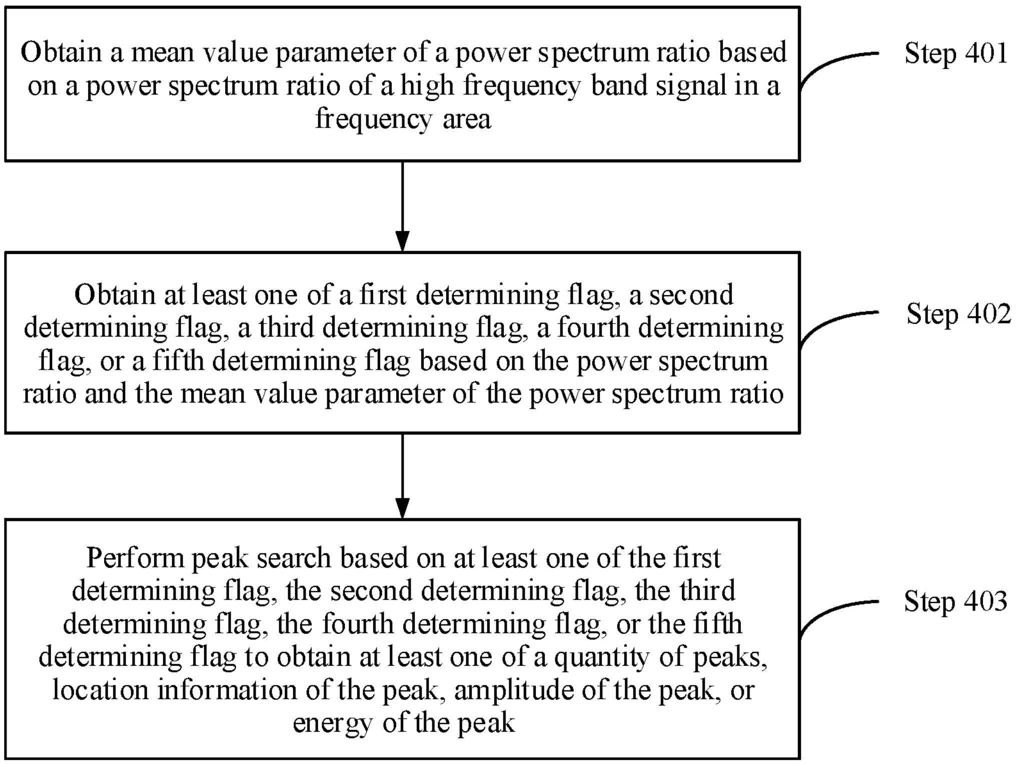
FIG. 7 is a flowchart of yet another audio signal coding method, according to an embodiment of this application.

FIG. 7 is a flowchart of another audio signal coding method according to an embodiment of this application. This embodiment of this application may be executed by the foregoing encoder or a core encoder inside the encoder. In this embodiment, step 304 in the embodiment shown in FIG. 6 is specifically explained and described. In this embodiment, one frequency area is used as an example for description. As shown in FIG. 7, the method in this embodiment may include the following steps.

Step 401: Obtain a mean value parameter of a power spectrum ratio based on a power spectrum ratio of a high frequency band signal in a frequency area.

The mean value parameter of the power spectrum ratio includes at least one of a first mean value parameter of the power spectrum ratio, a second mean value parameter of the power spectrum ratio, or a third mean value parameter of the power spectrum ratio.

The first mean value parameter is a mean value of power spectrum ratios of all frequencies in the frequency area. In other words, the first mean value parameter corresponds to a frequency area, for example, corresponds to one frequency area.

The foregoing formula (1) and formula (2) are used as examples to explain and describe the first mean value parameter in this embodiment. The first mean value parameter mean_ratio may be calculated according to the following formula (3).

$$\text{mean\_ratio} = \frac{1}{\text{tile\_width}} \sum_{sb} \text{peak\_ratio}[sb] \tag{3}$$

tile_width is tile width, tile[p] is a start frequency of the $p^{th}$ tile, and sb belongs to [tile[p], tile[p]+tile_width−1].

The second mean value parameter is a mean value of power spectrum ratios of a left neighboring area of a frequency. The left neighboring area refers to N_neighbor_l frequencies whose frequency numbers are smaller than a frequency number of the frequency. In other words, the second mean value parameter corresponds to each frequency in a frequency area. For example, one second mean value parameter corresponds to one frequency.

The foregoing formula (1) and formula (2) are used as examples to explain and describe the second mean value parameter in this embodiment. The second mean value parameter neighbor_l may be calculated according to the following formula (4).

$$\text{neighbor\_l} = \frac{1}{\text{N\_neighbor\_l}} \sum_{sb} \text{peak\_ratio}[sb] \tag{4}$$

N_neighbor_l is a quantity of frequencies in the left neighboring area, for example, 3. sb is a frequency number, and the left neighboring area of sb includes frequencies in [sb−N_neighbor_l, sb−1].

The third mean value parameter is a mean value of power spectrum ratios of a right neighboring area of a frequency. The right neighboring area refers to N_neighbor_r frequencies whose frequency numbers are greater than a frequency number of the frequency. In other words, the third mean value parameter corresponds to each frequency in a frequency area. For example, one third mean value parameter corresponds to one frequency.

The foregoing formula (1) and formula (2) are used as examples to explain and describe the third mean value parameter in this embodiment. The third mean value parameter neighbor_r may be calculated according to the following formula (5).

$$\text{neighbor\_r} = \frac{1}{\text{N\_neighbor\_r}} \sum_{sb} \text{peak\_ratio}[sb] \tag{5}$$

N_neighbor_r is a quantity of frequencies in the right neighboring area, for example, 3. sb is a frequency number, and the right neighboring area of sb includes frequencies in [sb+1, sb+N_neighbor_r].

Step 402: Obtain at least one of a first determining flag, a second determining flag, a third determining flag, a fourth determining flag, or a fifth determining flag based on the power spectrum ratio and the mean value parameter of the power spectrum ratio.

At least one of a first determining flag, a second determining flag, a third determining flag, a fourth determining flag, or a fifth determining flag for each frequency in a frequency area is obtained.

One frequency is used as an example for description. The first determining flag may be determined based on a power spectrum ratio of the frequency and a first preset threshold. If the power spectrum ratio of the frequency is greater than the first preset threshold, the first determining flag is 1. Otherwise, the first determining flag is 0. The first preset threshold may be a real number greater than zero, and may be flexibly set according to a requirement. For example, the first preset threshold is 2.0, that is, it is determined whether the power spectrum ratio of the frequency meets a condition 1 (Cond1). Cond1: peak_ratio[sb]≥2.0f. When the condition 1 (Cond1) is met, the first determining flag is 1. Otherwise, the first determining flag is 0.

The second determining flag is determined based on the power spectrum ratio of the frequency, a power spectrum ratio of a neighboring frequency left to the frequency, and a power spectrum ratio of a neighboring frequency right to the frequency. If the power spectrum ratio of the frequency is greater than both the power spectrum ratio of the neighboring frequency left to the frequency and the power spectrum ratio of the neighboring frequency right to the frequency, the second determining flag is 1. Otherwise, the second determining flag is 0. For example, it is determined whether the power spectrum ratio of the frequency meets a condition 2 (Cond2). Cond2: peak_ratio[sb]>peak_ratio[sb−1]且. peak_ratio[sb]>peak_ratio[sb+1]. When the condition 2 (Cond2) is met, the second determining flag is 1. Otherwise, the second determining flag is 0.

The third determining flag is determined based on the power spectrum ratio of the frequency and the second mean value parameter. If the power spectrum ratio of the frequency is greater than the second mean value parameter, or a difference between the power spectrum ratio of the frequency and the second mean value parameter is greater than a second preset threshold, the third determining flag is 1. Otherwise, the third determining flag is 0. For example, the second preset threshold is 12. It is determined whether the power spectrum ratio of the frequency meets a condition 3 (Cond3). Cond3: peak_ratio[sb]>neighbor_l+12. When the condition 3 (Cond3) is met, the third determining flag is 1. Otherwise, the third determining flag is 0.

The fourth determining flag is determined based on the power spectrum ratio of the frequency and the third mean value parameter. If the power spectrum ratio of the frequency is greater than the third mean value parameter, or a difference between the power spectrum ratio of the frequency and the third mean value parameter is greater than a third preset threshold, the fourth determining flag is 1. Otherwise, the fourth determining flag is 0. For example, the third preset threshold is 12. It is determined whether the power spectrum ratio of the frequency meets a condition 4 (Cond4). Cond4: peak_ratio[sb]>neighbor_r+12. When the condition 4 (Cond4) is met, the fourth determining flag is 1. Otherwise, the fourth determining flag is 0.

The fifth determining flag is determined based on the power spectrum ratio of the frequency and the first mean value parameter. If the power spectrum ratio of the frequency is greater than the first mean value parameter, or a difference between the power spectrum ratio of the frequency and the first mean value parameter is greater than a fourth preset threshold, the fifth determining flag is 1. Otherwise, the fifth determining flag is 0. For example, the third preset threshold is 25. It is determined whether the power spectrum ratio of the frequency meets a condition 5 (Cond5). Cond5: peak_ratio[sb]>mean_ratio+25. When the condition 5 (Cond5) is met, the fifth determining flag is 1. Otherwise, the fifth determining flag is 0.

Step 403: Perform peak search based on at least one of the first determining flag, the second determining flag, the third determining flag, the fourth determining flag, or the fifth determining flag to obtain at least one of a quantity of peaks, location information of the peak, amplitude of the peak, or energy of the peak in the frequency area.

For example, peak search is performed on each frequency in the frequency area. If at least one of a first determining flag, a second determining flag, a third determining flag, a fourth determining flag, or a fifth determining flag corresponding to the frequency is 1, the frequency is a frequency corresponding to the peak. A frequency number of the frequency is the location information of the peak, a power spectrum ratio of the frequency is the amplitude or energy information of the peak, and a quantity of peaks that meet all of the conditions in the frequency area is the quantity of peaks in the frequency area.

For another example, peak search is performed on each frequency in the frequency area. If a first determining flag, a second determining flag, a third determining flag, a fourth determining flag, and a fifth determining flag corresponding to the frequency are all 1, the frequency is a frequency corresponding to the peak. A frequency number of the frequency is the location information of the peak, a power spectrum ratio of the frequency is the amplitude or energy information of the peak, and a quantity of peaks that meet all of the conditions in the frequency area is the quantity of peaks in the frequency area. That is, energy of the frequency at which the peak is located is greater than the first preset threshold, greater than energy of a left neighboring frequency, greater than energy of a right neighboring frequency, greater than energy of a left neighboring area, greater than energy of a right neighboring area, and greater than mean energy.

For still another example, peak search is performed on each frequency in the frequency area. If a first determining flag and a second determining flag corresponding to the frequency are both 1, the frequency is a frequency corresponding to the peak. A frequency number of the frequency is the location information of the peak, a power spectrum ratio of the frequency is the amplitude or energy information of the peak, and a quantity of peaks that meet all of the conditions in the frequency area is the quantity of peaks in the frequency area.

A peak that meets the foregoing conditions is used as a candidate of a tonal component. A location of the peak and a power spectrum ratio of the peak are respectively stored in a peak identifier (peak_idx) and a peak value (peak_val) arrays, and a quantity of peaks is peak_cnt.

In this embodiment, the mean value parameter of the power spectrum ratio is obtained based on the power spectrum ratio of the high frequency band signal in the frequency area, and peak search may be performed on each frequency in the frequency area based on the mean value parameter of the power spectrum ratio, to determine a peak in the frequency area, and further determine tonal component information based on the peak. Because the power spectrum ratio is a ratio of a power spectrum to a mean power spectrum, and can better reflect a signal characteristic, the tonal component information can be accurately obtained, so that a decoder side can reconstruct the high frequency band signal more accurately based on the tonal component information, and the audio signal can be accurately obtained. This improves quality of coding.

Based on a same inventive concept as the foregoing method, an embodiment of this application further provides an audio signal coding apparatus. The audio signal coding apparatus may be used in an audio encoder.

Figure 8:
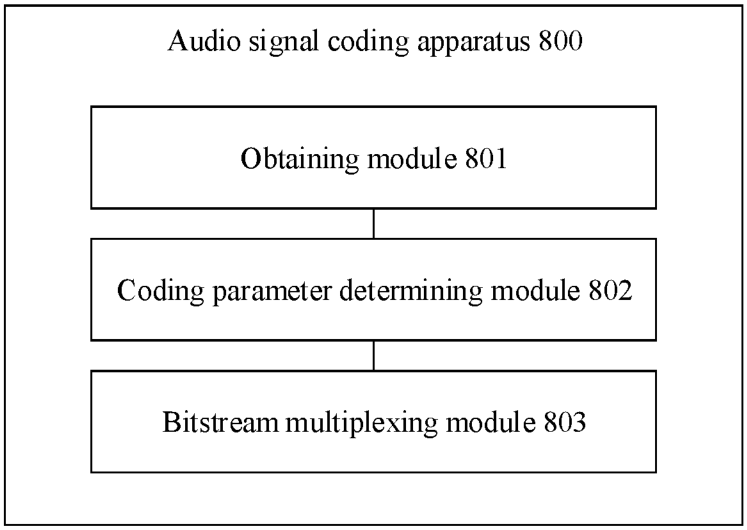
FIG. 8 is a schematic diagram of an audio signal coding apparatus, according to an embodiment of this application.

FIG. 8 is a schematic diagram depicting a structure of an audio signal coding apparatus according to an embodiment of this application. As shown in FIG. 8, an audio signal coding apparatus 800 includes an obtaining module 801, a coding parameter determining module 802, and a bitstream multiplexing module 803.

The obtaining module 801 is configured to obtain a current frame of an audio signal.

The coding parameter determining module 802 is configured to obtain a coding parameter based on a power spectrum ratio of a current frequency in a current frequency area of at least a part of signals of the current frame. The coding parameter indicates tonal component information of the at least a part of signals. The tonal component information includes at least one of location information of a tonal component, quantity information of tonal components, amplitude information of the tonal component, or energy information of the tonal component. The power spectrum ratio of the current frequency is a ratio of a value of a power spectrum of the current frequency to a mean value of power spectrums in the current frequency area.

The bitstream multiplexing module 803 is configured to perform bitstream multiplexing on the coding parameter to obtain a coded bitstream.

In some embodiments, the coding parameter determining module 802 is configured to: perform peak search in the current frequency area based on the power spectrum ratio of the current frequency, to obtain at least one of quantity information of peaks, location information of the peak, amplitude information of the peak, or energy information of the peak in the current frequency area, where the peak is a power spectrum peak or a power spectrum ratio peak; and obtain the coding parameter based on at least one of the quantity information of peaks, the location information of the peak, the amplitude information of the peak, or the energy information of the peak in the current frequency area.

In some embodiments, the coding parameter determining module 802 is configured to: perform peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency.

The left neighboring area of the current frequency includes N_neighbor_l frequencies whose frequency numbers are smaller than a frequency number of the current frequency, and N_neighbor_l is any natural number. The right neighboring area of the current frequency includes N_neighbor_r frequencies whose frequency numbers are greater than the frequency number of the current frequency, and N_neighbor_r is any natural number. The left neighboring frequency of the current frequency is a frequency whose frequency number is 1 smaller than that of the current frequency, and the right neighboring frequency of the current frequency is a frequency whose frequency number is 1 greater than that of the current frequency.

In some embodiments, the coding parameter determining module 802 is configured to: determine whether the power spectrum ratio of the current frequency meets the following conditions: greater than or equal to a first preset threshold; greater than the power spectrum ratio of the left neighboring frequency of the current frequency; greater than the power spectrum ratio of the right neighboring frequency of the current frequency; a difference between the power spectrum ratio of the current frequency and the mean value of the power spectrum ratios of the left neighboring area of the current frequency is greater than a second preset threshold; a difference between the power spectrum ratio of the current frequency and the mean value of the power spectrum ratios of the right neighboring area of the current frequency is greater than a third preset threshold; and a difference between the power spectrum ratio of the current frequency and the mean value of the power spectrum ratios of the current frequency area is greater than a fourth preset threshold; and determine that the current frequency is a frequency corresponding to the peak when the power spectrum ratio of the current frequency meets the conditions.

In some embodiments, the coding parameter determining module 802 is configured to: determine whether the power spectrum ratio of the current frequency meets at least one of the following conditions: greater than or equal to the first preset threshold; greater than the power spectrum ratio of the left neighboring frequency of the current frequency; greater than the power spectrum ratio of the right neighboring frequency of the current frequency; greater than the mean value of the power spectrum ratios of the left neighboring area of the current frequency; greater than the mean value of the power spectrum ratios of the right neighboring area of the current frequency; or greater than the mean value of the power spectrum ratios of the current frequency area; and determine that the current frequency is a frequency corresponding to the peak when at least one of the conditions is met.

In some embodiments, the coding parameter determining module 802 is configured to: determine whether the power spectrum ratio of the current frequency meets the following conditions: greater than or equal to the first preset threshold; greater than the power spectrum ratio of the left neighboring frequency of the current frequency; and greater than the power spectrum ratio of the right neighboring frequency of the current frequency; and determine that the current frequency is a frequency corresponding to the peak when the conditions are met.

In some embodiments, the coding parameter determining module 802 is configured to: determine at least one of the quantity information of tonal components, the location information of the tonal component, the amplitude information of the tonal component, or the energy information of the tonal component based on at least one of the quantity information of peaks, the location information of the peak, the amplitude information of the peak, or the energy information of the peak in the current frequency area; and obtain the coding parameter based on at least one of the quantity information of tonal components, the location information of the tonal component, the amplitude information of the tonal component, or the energy information of the tonal component.

In some embodiments, the at least a part of signals include a high frequency band signal of the current frame.

It should be noted that the obtaining module 801, the coding parameter determining module 802, and the bitstream multiplexing module 803 may be applied to an audio signal coding process on an encoder side.

It should be further noted that, for specific implementation processes of the obtaining module 801, the coding parameter determining module 802, and the bitstream multiplexing module 803, reference may be made to detailed descriptions of the foregoing method embodiments. For brevity of the specification, details are not described herein again.

Based on a same inventive concept as the foregoing method, an embodiment of this application provides an audio signal encoder. The audio signal encoder is configured to code an audio signal, and includes, for example, the encoder described in the foregoing one or more embodiments. The audio signal coding apparatus is configured to perform coding to generate a corresponding bitstream.

Figure 9:
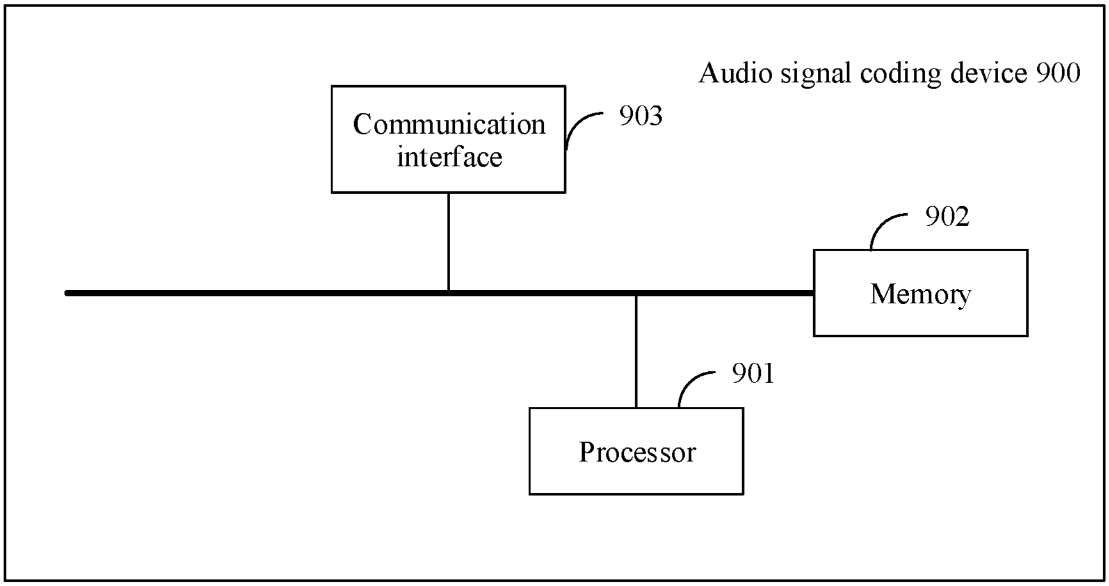
FIG. 9 is a schematic diagram of an audio signal coding device, according to an embodiment of this application.

Based on a same inventive concept as the foregoing method, an embodiment of this application provides a device for audio signal coding, for example, an audio signal coding device. As shown in FIG. 9, an audio signal coding device 900 includes:

a processor 901, a memory 902, and a communication interface 903 (there may be one or more processors 901 in the audio signal coding device 900, and FIG. 9 shows an example with one processor). In some embodiments of this application, the processor 901, the memory 902, and the communication interface 903 may be connected through a bus or in another manner. FIG. 9 shows an example of connection through a bus.

The memory 902 may include a read-only memory and a random access memory, and provides an instruction and data for the processor 901. A part of the memory 902 may further include a non-volatile random access memory (NVRAM). The memory 902 stores an operating system and operation instructions, an executable module or a data structure, or a subset thereof or an extended set thereof. The operation instructions may include various operation instructions for implementing various operations. The operating system may include various system programs for implementing various basic services and processing a hardware-based task.

The processor 901 controls an operation of the audio coding device, and the processor 901 may also be referred to as a central processing unit (CPU). In specific application, components of the audio coding device are coupled together by using a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 901 or may be implemented by the processor 901. The processor 901 may be an integrated circuit chip and has a signal processing capability. In an implementation process, steps in the foregoing methods can be implemented by using a hardware integrated logical circuit in the processor 901, or by using instructions in a form of software. The processor 901 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 902, and the processor 901 reads information in the memory 902 and completes the steps in the foregoing methods in combination with hardware of the processor 901.

The communication interface 903 may be configured to receive or send digit or character information, for example, may be an input/output interface, a pin, or a circuit. For example, the foregoing coded bitstream is sent through the communication interface 903.

Based on a same inventive concept as the foregoing method, an embodiment of this application provides an audio coding device, including a non-volatile memory and a processor that are coupled to each other. The processor invokes program code stored in the memory to perform a part or all of the steps of the audio signal coding method in the foregoing one or more embodiments.

Based on a same inventive concept as the foregoing method, an embodiment of this application provides a computer-readable storage medium. The computer-readable storage medium stores program code, and the program code includes instructions for performing a part or all of the steps of the audio signal coding method in the foregoing one or more embodiments.

Based on a same inventive concept as the foregoing method, an embodiment of this application provides a computer program product. When the computer program product runs on a computer, the computer is enabled to perform a part or all of the steps of the audio signal coding method in the foregoing one or more embodiments.

The processor mentioned in the foregoing embodiments may be an integrated circuit chip, and has a signal processing capability. In an implementation process, the steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps in the methods disclosed in embodiments of this application may be directly performed and completed by a hardware coding processor, or may be performed and completed by using a combination of hardware in the coding processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in the foregoing embodiments may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not limitative description, many forms of RAMs are available, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memories in the system and method described in this specification include but are not limited to these memories and any memory of another suitable type.

A person of ordinary skill in the art may be aware that, in combination with units and algorithm steps in the examples described in embodiments disclosed in this specification, this application can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of the embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio signal coding method, comprising:

obtaining a current frame of an audio signal;

obtaining a coding parameter based on a power spectrum ratio of a current frequency in a current frequency area of at least a part of signals of the current frame, wherein the coding parameter indicates tonal component information of the at least a part of the signals, wherein the tonal component information comprises at least one of location information of a tonal component, quantity information of tonal components, amplitude information of the tonal component, or energy information of the tonal component, and wherein the power spectrum ratio of the current frequency is a ratio of a value of a power spectrum of the current frequency to a mean value of power spectrums in the current frequency area; and performing bitstream multiplexing on the coding parameter to obtain a coded bitstream.

2. The audio signal coding method according to claim 1, wherein the obtaining a coding parameter based on a power spectrum ratio of a current frequency in a current frequency area of at least a part of signals comprises:

performing a peak search in the current frequency area based on the power spectrum ratio of the current frequency to obtain at least one of quantity information of peaks, location information of the peak, amplitude information of the peak, or energy information of the peak in the current frequency area, wherein the peak is a power spectrum peak or a power spectrum ratio peak; and obtaining the coding parameter based on at least one of the quantity information of peaks, the location information of the peak, the amplitude information of the peak, or the energy information of the peak in the current frequency area.

3. The audio signal coding method according to claim 2, wherein the performing peak search in the current frequency area based on the power spectrum ratio of the current frequency comprises:

performing peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency, wherein the left neighboring area of the current frequency comprises N_neighbor_l frequencies whose frequency numbers are less than a frequency number of the current frequency and N_neighbor_l is a natural number, and wherein the right neighboring area of the current frequency comprises N_neighbor_r frequencies whose frequency numbers are greater than the frequency number of the current frequency and N_neighbor_r is a natural number, and wherein the left neighboring frequency of the current frequency is a frequency whose frequency number is 1 less than that of the current frequency and the right neighboring frequency of the current frequency is a frequency whose frequency number is 1 greater than that of the current frequency.

4. The audio signal coding method according to claim 3, wherein the performing peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency comprises:

determining whether the power spectrum ratio of the current frequency meets the following conditions: greater than or equal to a first preset threshold, greater than the power spectrum ratio of the left neighboring frequency of the current frequency, greater than the power spectrum ratio of the right neighboring frequency of the current frequency, a difference between the power spectrum ratio of the current frequency and the mean value of the power spectrum ratios of the left neighboring area of the current frequency is greater than a second preset threshold, a difference between the power spectrum ratio of the current frequency and the mean value of the power spectrum ratios of the right neighboring area of the current frequency is greater than a third preset threshold, and a difference between the power spectrum ratio of the current frequency and the mean value of the power spectrum ratios of the current frequency area is greater than a fourth preset threshold; and determining that the current frequency is a frequency corresponding to the peak in the current frequency area in response to the conditions being met.

5. The audio signal coding method according to claim 2, wherein the performing peak search in the current frequency area based on the power spectrum ratio of the current frequency comprises:

determining whether the power spectrum ratio of the current frequency meets at least one of the following conditions: greater than or equal to a first preset threshold, greater than a power spectrum ratio of a left neighboring frequency of the current frequency, greater than a power spectrum ratio of a right neighboring frequency of the current frequency, greater than a mean value of power spectrum ratios of a left neighboring area of the current frequency, greater than a mean value of power spectrum ratios of a right neighboring area of the current frequency, or greater than a mean value of power spectrum ratios of the current frequency area; and determining that the current frequency is a frequency corresponding to the peak in the current frequency area in response to the power spectrum ratio of the current frequency meeting at least one of the conditions, wherein the left neighboring area of the current frequency comprises N_neighbor_l frequencies whose frequency numbers are less than a frequency number of the current frequency and N_neighbor_l is a natural number, and wherein the right neighboring area of the current frequency comprises N_neighbor_r frequencies whose frequency numbers are greater than the frequency number of the current frequency and N_neighbor_r is a natural number, and wherein the left neighboring frequency of the current frequency is a frequency whose frequency number is 1 less than that of the current frequency and the right neighboring frequency of the current frequency is a frequency whose frequency number is 1 greater than that of the current frequency.

6. The audio signal coding method according to claim 2, wherein the performing peak search in the current frequency area based on the power spectrum ratio of the current frequency comprises:

determining whether the power spectrum ratio of the current frequency meets the following conditions: greater than or equal to a first preset threshold, greater than a power spectrum ratio of a left neighboring frequency of the current frequency, and greater than a power spectrum ratio of a right neighboring frequency of the current frequency; and determining that the current frequency is a frequency corresponding to the peak in the current frequency area in response to the conditions being met, wherein the left neighboring frequency of the current frequency is a frequency whose frequency number is 1 less than that of the current frequency and the right neighboring frequency of the current frequency is a frequency whose frequency number is 1 greater than that of the current frequency.

7. The audio signal coding method according to claim 2, wherein the obtaining the coding parameter based on at least one of the quantity information of peaks, the location information of the peak, the amplitude information of the peak, or the energy information of the peak in the current frequency area comprises:

determining at least one of the quantity information of tonal components, the location information of the tonal component, the amplitude information of the tonal component, or the energy information of the tonal component based on at least one of the quantity information of peaks, the location information of the peak, the amplitude information of the peak, or the energy information of the peak in the current frequency area; and obtaining the coding parameter based on at least one of the quantity information of tonal components, the location information of the tonal component, the amplitude information of the tonal component, or the energy information of the tonal component.

8. The audio signal coding method of claim 1, wherein the at least a part of the signals comprises a high frequency band signal of the current frame.

9. An audio signal coding apparatus comprising:

at least one processor; and one or more memories coupled to the at least one processor and storing programming instructions for execution by the at least one processor to cause the audio signal coding apparatus to:

obtain a current frame of an audio signal;

obtain a coding parameter based on a power spectrum ratio of a current frequency in a current frequency area of at least a part of signals of the current frame, wherein the coding parameter indicates tonal component information of the at least a part of the signals, wherein the tonal component information comprises at least one of location information of a tonal component, quantity information of tonal components, amplitude information of the tonal component, or energy information of the tonal component, and wherein the power spectrum ratio of the current frequency is a ratio of a value of a power spectrum of the current frequency to a mean value of power spectrums in the current frequency area; and perform bitstream multiplexing on the coding parameter to obtain a coded bitstream.

10. The audio signal coding apparatus according to claim 9, wherein the programming instructions for execution by the at least one processor to cause the audio signal coding apparatus further to:

perform a peak search in the current frequency area based on the power spectrum ratio of the current frequency, to obtain at least one of quantity information of peaks, location information of the peak, amplitude information of the peak, or energy information of the peak in the current frequency area, wherein the peak is a power spectrum peak or a power spectrum ratio peak; and obtain the coding parameter based on at least one of the quantity information of peaks, the location information of the peak, the amplitude information of the peak, or the energy information of the peak in the current frequency area.

11. The audio signal coding apparatus according to claim 10, wherein the programming instructions for execution by the at least one processor to cause the audio signal coding apparatus further to:

perform peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency, wherein the left neighboring area of the current frequency comprises N_neighbor_l frequencies whose frequency numbers are less than a frequency number of the current frequency, and N_neighbor_l is a natural number, and wherein the right neighboring area of the current frequency comprises N_neighbor_r frequencies whose frequency numbers are greater than the frequency number of the current frequency, and N_neighbor_r is a natural number, and wherein the left neighboring frequency of the current frequency is a frequency whose frequency number is 1 less than that of the current frequency, and the right neighboring frequency of the current frequency is a frequency whose frequency number is 1 greater than that of the current frequency.

12. The audio signal coding apparatus according to claim 11, wherein the programming instructions for execution by the at least one processor to cause the audio signal coding apparatus further to:

determine whether the power spectrum ratio of the current frequency meets the following conditions: greater than or equal to a first preset threshold, greater than the power spectrum ratio of the left neighboring frequency of the current frequency, greater than the power spectrum ratio of the right neighboring frequency of the current frequency, a difference between the power spectrum ratio of the current frequency and the mean value of the power spectrum ratios of the left neighboring area of the current frequency is greater than a second preset threshold, a difference between the power spectrum ratio of the current frequency and the mean value of the power spectrum ratios of the right neighboring area of the current frequency is greater than a third preset threshold, and a difference between the power spectrum ratio of the current frequency and the mean value of the power spectrum ratios of the current frequency area is greater than a fourth preset threshold; and determine that the current frequency is a frequency corresponding to the peak in the current frequency area in response to the conditions being met.

13. The audio signal coding apparatus according to claim 9, wherein the programming instructions for execution by the at least one processor to cause the audio signal coding apparatus further to:

determine whether the power spectrum ratio of the current frequency meets at least one of the following conditions: greater than or equal to a first preset threshold greater than a power spectrum ratio of a left neighboring frequency of the current frequency greater than a power spectrum ratio of a right neighboring frequency of the current frequency greater than a mean value of power spectrum ratios of a left neighboring area of the current frequency greater than a mean value of power spectrum ratios of a right neighboring area of the current frequency or greater than a mean value of power spectrum ratios of the current frequency area; and determine that the current frequency is a frequency corresponding to the peak in the current frequency area in response to the power spectrum ratio of the current frequency meeting at least one of the conditions, wherein the left neighboring area of the current frequency comprises N_neighbor_l frequencies whose frequency numbers are less than a frequency number of the current frequency, and N_neighbor_l is a natural number, and wherein the right neighboring area of the current frequency comprises N_neighbor_r frequencies whose frequency numbers are greater than the frequency number of the current frequency, and N_neighbor_r is a natural number, and wherein the left neighboring frequency of the current frequency is a frequency whose frequency number is 1 less than that of the current frequency, and the right neighboring frequency of the current frequency is a frequency whose frequency number is 1 greater than that of the current frequency.

14. The audio signal coding apparatus according to claim 9, wherein the programming instructions for execution by the at least one processor to cause the audio signal coding apparatus further to:

determine whether the power spectrum ratio of the current frequency meets the following conditions: greater than or equal to a first preset threshold greater than a power spectrum ratio of a left neighboring frequency of the current frequency and greater than a power spectrum ratio of a right neighboring frequency of the current frequency; and determine that the current frequency is a frequency corresponding to the peak in the current frequency area in response the conditions being met, wherein the left neighboring frequency of the current frequency is a frequency whose frequency number is 1 less than that of the current frequency, and the right neighboring frequency of the current frequency is a frequency whose frequency number is 1 greater than that of the current frequency.

15. The audio signal coding apparatus according to claim 9, wherein the programming instructions for execution by the at least one processor to cause the audio signal coding apparatus further to:

determine at least one of the quantity information of tonal components, the location information of the tonal component, the amplitude information of the tonal component, or the energy information of the tonal component based on at least one of the quantity information of peaks, the location information of the peak, the amplitude information of the peak, or the energy information of the peak in the current frequency area; and obtain the coding parameter based on at least one of the quantity information of tonal components, the location information of the tonal component, the amplitude information of the tonal component, or the energy information of the tonal component.

16. The audio signal coding apparatus of claim 9, wherein the at least a part of the signals comprise a high frequency band signal of the current frame.

17. A non-transitory computer-readable storage medium storing computer instructions that, when executed by one or more processors, cause the one or more processors to perform the following operations:

obtaining a current frame of an audio signal;

obtaining a coding parameter based on a power spectrum ratio of a current frequency in a current frequency area of at least a part of signals of the current frame, wherein the coding parameter indicates tonal component information of the at least a part of the signals, wherein the tonal component information comprises at least one of location information of a tonal component, quantity information of tonal components, amplitude information of the tonal component, or energy information of the tonal component, and wherein the power spectrum ratio of the current frequency is a ratio of a value of a power spectrum of the current frequency to a mean value of power spectrums in the current frequency area; and performing bitstream multiplexing on the coding parameter to obtain a coded bitstream.

18. The non-transitory computer-readable storage medium of claim 17, wherein the computer instructions, when executed by the one or more processors, cause the one or more processors to perform the following further operations:

performing a peak search in the current frequency area based on the power spectrum ratio of the current frequency, to obtain at least one of quantity information of peaks, location information of the peak, amplitude information of the peak, or energy information of the peak in the current frequency area, wherein the peak is a power spectrum peak or a power spectrum ratio peak; and obtaining the coding parameter based on at least one of the quantity information of peaks, the location information of the peak, the amplitude information of the peak, or the energy information of the peak in the current frequency area.

19. The non-transitory computer-readable storage medium of claim 17, wherein the computer instructions, when executed by the one or more processors, cause the one or more processors to perform the following further operations:

performing peak search in the current frequency area based on the power spectrum ratio of the current frequency, a power spectrum ratio of a left neighboring frequency of the current frequency, a power spectrum ratio of a right neighboring frequency of the current frequency, a mean value of power spectrum ratios of the current frequency area, a mean value of power spectrum ratios of a left neighboring area of the current frequency, and a mean value of power spectrum ratios of a right neighboring area of the current frequency, wherein the left neighboring area of the current frequency comprises N_neighbor_l frequencies whose frequency numbers are less than a frequency number of the current frequency and N_neighbor_l is a natural number, and wherein the right neighboring area of the current frequency comprises N_neighbor_r frequencies whose frequency numbers are greater than the frequency number of the current frequency and N_neighbor_r is a natural number, and wherein the left neighboring frequency of the current frequency is a frequency whose frequency number is 1 less than that of the current frequency and the right neighboring frequency of the current frequency is a frequency whose frequency number is 1 greater than that of the current frequency;

or determining whether the power spectrum ratio of the current frequency meets at least one of the following conditions: greater than or equal to a first preset threshold greater than a power spectrum ratio of a left neighboring frequency of the current frequency greater than a power spectrum ratio of a right neighboring frequency of the current frequency greater than a mean value of power spectrum ratios of a left neighboring area of the current frequency greater than a mean value of power spectrum ratios of a right neighboring area of the current frequency or greater than a mean value of power spectrum ratios of the current frequency area; and determining that the current frequency is a frequency corresponding to the peak in the current frequency area in response to the power spectrum ratio of the current frequency meeting at least one of the conditions, wherein the left neighboring area of the current frequency comprises N_neighbor_l frequencies whose frequency numbers are less than a frequency number of the current frequency and N_neighbor_l is a natural number, and wherein the right neighboring area of the current frequency comprises N_neighbor_r frequencies whose frequency numbers are greater than the frequency number of the current frequency and N_neighbor_r is a natural number, wherein the left neighboring frequency of the current frequency is a frequency whose frequency number is 1 less than that of the current frequency, and the right neighboring frequency of the current frequency is a frequency whose frequency number is 1 greater than that of the current frequency;

or determining whether the power spectrum ratio of the current frequency meets the following conditions: greater than or equal to a first preset threshold greater than a power spectrum ratio of a left neighboring frequency of the current frequency and greater than a power spectrum ratio of a right neighboring frequency of the current frequency; and determining that the current frequency is a frequency corresponding to the peak in the current frequency area when the conditions are met, wherein the left neighboring frequency of the current frequency is a frequency whose frequency number is 1 less than that of the current frequency and the right neighboring frequency of the current frequency is a frequency whose frequency number is 1 greater than that of the current frequency.

20. The non-transitory computer-readable storage medium of claim 19, wherein the computer instructions, when executed by the one or more processors, cause the one or more processors to perform the following further operations:

determining whether the power spectrum ratio of the current frequency meets the following conditions: greater than or equal to a first preset threshold, greater than the power spectrum ratio of the left neighboring frequency of the current frequency, greater than the power spectrum ratio of the right neighboring frequency of the current frequency, a difference between the power spectrum ratio of the current frequency and the mean value of the power spectrum ratios of the left neighboring area of the current frequency is greater than a second preset threshold, a difference between the power spectrum ratio of the current frequency and the mean value of the power spectrum ratios of the right neighboring area of the current frequency is greater than a third preset threshold, and a difference between the power spectrum ratio of the current frequency and the mean value of the power spectrum ratios of the current frequency area is greater than a fourth preset threshold; and determining that the current frequency is a frequency corresponding to the peak in the current frequency area in response to the conditions being met.

* * * * *